United States Patent
Hattori et al.

(10) Patent No.: US 7,664,773 B2
(45) Date of Patent: Feb. 16, 2010

(54) STRUCTURED DATA STORAGE METHOD, STRUCTURED DATA STORAGE APPARATUS, AND RETRIEVAL METHOD

(75) Inventors: Masakazu Hattori, Yokohama (JP); Yosuke Kuroda, Kawasaki (JP); Takuya Kanawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 407 days.

(21) Appl. No.: 11/053,173

(22) Filed: Feb. 9, 2005

(65) Prior Publication Data
US 2005/0192983 A1 Sep. 1, 2005

(30) Foreign Application Priority Data
Feb. 10, 2004 (JP) .............................. 2004-033493

(51) Int. Cl.
*G06F 17/30* (2006.01)
*G06F 15/16* (2006.01)

(52) U.S. Cl. ..................................... 707/102
(58) Field of Classification Search ................. 707/102
See application file for complete search history.

(56) References Cited

U.S. PATENT DOCUMENTS

| | | | | |
|---|---|---|---|---|
| 2002/0188604 A1* | 12/2002 | Tada et al. | ...................... | 707/3 |
| 2003/0050939 A1* | 3/2003 | Dietz et al. | ................. | 707/203 |
| 2003/0212674 A1* | 11/2003 | Nakagawa | ...................... | 707/3 |

FOREIGN PATENT DOCUMENTS

| JP | 2000-057163 | 2/2000 |
|---|---|---|
| JP | 2001-034618 | 2/2001 |
| JP | 2001-034619 | 2/2001 |

OTHER PUBLICATIONS

Hattori, M. et al., "Structured Data Retrieval Apparatus, Method, And Computer Readable Medium," U.S. Appl. No. 10/935,627, filed Sep. 8, 2004.
Hattori, M. et al., "Structured Document Search Method, Structured Document Search Apparatus and Structured Document Search System," U.S. Appl. No. 09/714,627, filed Nov. 17, 2000.
Notification of Reasons for Rejection with English Translation for Japanese Patent Application No. 2004-033493, mailed Mar. 4, 2008.

* cited by examiner

*Primary Examiner*—John E Breene
*Assistant Examiner*—Alex Gofman
(74) *Attorney, Agent, or Firm*—Finnegan, Henderson, Farabow, Garrett & Dunner, L.L.P.

(57) ABSTRACT a structured data storage apparatus inputs a given number of structured data items each including respective hierarchical structures of element data items, stores structured data items in first memory, extracts common hierarchical structure of first group of element data items, which is included in and common to structured data items, from the structured data items, based on frequencies of occurrence of first group in structured data items, inputs structured data item to be stored, which includes common hierarchical structure of first group, assigns element IDs corresponding to respective element data items of first group to storage areas allocated to respective element data items of first group in memory location of first memory, the memory location being allocated to structured data item to be stored, stores first group included in structured data item to be stored in respective storage areas in memory location.

8 Claims, 30 Drawing Sheets

```
<book>
  <title>XML database</title>
  <authors>
    <author>
      <first>Taro</first>
      <last>Tanaka</last>
    </author>
    <author>
      <first>Jiro</first>
      <last>Nakamura</last>
    </author>
  </authors>
  <abstract>
  Retrieval technique for XML data
  </abstract>
</book>
```

F I G. 1

Statistical data

| Num Regist | 1 | | | | | | | |
|---|---|---|---|---|---|---|---|---|
| | SumOcc | SumOcc2 | MinOcc | MaxOcc | OldOffset | NumSib | Average | Standard deviation |
| D2 | 1 | 1 | 1 | 1 | UNDEF | UNDEF | 1 | 0.0 |
| E3 | 1 | 1 | 1 | 1 | UNDEF | UNDEF | 1 | 0.0 |
| T4 | 1 | 1 | 1 | 1 | UNDEF | UNDEF | 1 | 0.0 |
| E5 | 1 | 1 | 1 | 1 | UNDEF | UNDEF | 1 | 0.0 |
| E6 | 2 | 4 | 2 | 2 | UNDEF | UNDEF | 2 | 0.0 |
| E7 | 1 | 1 | 1 | 1 | UNDEF | UNDEF | 1 | 0.0 |
| T8 | 1 | 1 | 1 | 1 | UNDEF | UNDEF | 1 | 0.0 |
| E9 | 1 | 1 | 1 | 1 | UNDEF | UNDEF | 1 | 0.0 |
| T10 | 1 | 1 | 1 | 1 | UNDEF | UNDEF | 1 | 0.0 |
| E11 | 1 | 1 | 1 | 1 | UNDEF | UNDEF | 1 | 0.0 |
| T12 | 1 | 1 | 1 | 1 | UNDEF | UNDEF | 1 | 0.0 |

F I G. 11

```
<book>
  <title>SGML database</title>
  <authors>
    <author>
      <first>Taro</first>
      <last>Tanaka</last>
    </author>
  </authors>
  <abstract>
  Retrieval technique for SGML data
  </abstract>
</book>
```

FIG. 18

| Num Regist | 2 | | | | | | | |
|---|---|---|---|---|---|---|---|---|
| | SumOcc | SumOcc2 | MinOcc | MaxOcc | OldOffset | NumSib | Average | Standard deviation |
| D2 | 2 | 2 | 1 | 1 | UNDEF | UNDEF | 1 | 0.0 |
| E3 | 2 | 2 | 1 | 1 | UNDEF | UNDEF | 1 | 0.0 |
| T4 | 2 | 2 | 1 | 1 | UNDEF | UNDEF | 1 | 0.0 |
| E5 | 2 | 2 | 1 | 1 | UNDEF | UNDEF | 1 | 0.0 |
| E6 | 3 | 5 | 1 | 2 | UNDEF | UNDEF | 1.5 | 0.5 |
| E7 | 2 | 2 | 1 | 1 | UNDEF | UNDEF | 1 | 0.0 |
| T8 | 2 | 2 | 1 | 1 | UNDEF | UNDEF | 1 | 0.0 |
| E9 | 2 | 2 | 1 | 1 | UNDEF | UNDEF | 1 | 0.0 |
| T10 | 2 | 2 | 1 | 1 | UNDEF | UNDEF | 1 | 0.0 |
| E11 | 2 | 2 | 1 | 1 | UNDEF | UNDEF | 1 | 0.0 |
| T12 | 2 | 2 | 1 | 1 | UNDEF | UNDEF | 1 | 0.0 |

FIG. 19

```
<book>
  <title>OS basic</title>
  <authors>
    <author>
      <first>Taro</first>
      <last>Yamamoto</last>
    </author>
    <author>
      <first>Jiro</first>
      <last>Nakamura</last>
    </author>
  </authors>
  <abstract>
    OS architecture
  </abstract>
</book>
```

FIG. 20

| Num Regist | 3 | | | | | | | |
|---|---|---|---|---|---|---|---|---|
| | SumOcc | SumOcc2 | MinOcc | MaxOcc | OldOffset | NumSib | Average | Standard deviation |
| D2 | 3 | 3 | 1 | 1 | UNDEF | UNDEF | 1 | 0.0 |
| E3 | 3 | 3 | 1 | 1 | UNDEF | UNDEF | 1 | 0.0 |
| T4 | 3 | 3 | 1 | 1 | UNDEF | UNDEF | 1 | 0.0 |
| E5 | 3 | 3 | 1 | 1 | UNDEF | UNDEF | 1 | 0.0 |
| E6 | 5 | 9 | 1 | 2 | UNDEF | UNDEF | 1.666667 | 0.5 |
| E7 | 3 | 3 | 1 | 1 | UNDEF | UNDEF | 1 | 0.0 |
| T8 | 3 | 3 | 1 | 1 | UNDEF | UNDEF | 1 | 0.0 |
| E9 | 3 | 3 | 1 | 1 | UNDEF | UNDEF | 1 | 0.0 |
| T10 | 3 | 3 | 1 | 1 | UNDEF | UNDEF | 1 | 0.0 |
| E11 | 2 | 2 | 0 | 1 | UNDEF | UNDEF | 0.666667 | 0.5 |
| T12 | 2 | 2 | 0 | 1 | UNDEF | UNDEF | 0.666667 | 0.5 |

FIG. 21

| Num Regist | 100 | | | | | | | |
|---|---|---|---|---|---|---|---|---|
| | SumOcc | SumOcc2 | MinOcc | MaxOcc | OldOffset | NumSib | Average | Standard deviation |
| D2 | 100 | 100 | 1 | 1 | UNDEF | UNDEF | 1 | 0.0 |
| E3 | 100 | 100 | 1 | 1 | UNDEF | UNDEF | 1 | 0.0 |
| T4 | 100 | 100 | 1 | 1 | UNDEF | UNDEF | 1 | 0.0 |
| E5 | 100 | 100 | 1 | 1 | UNDEF | UNDEF | 1 | 0.0 |
| E6 | 250 | 640 | 1 | 3 | UNDEF | UNDEF | 2.5 | 0.4 |
| E7 | 100 | 100 | 1 | 1 | UNDEF | UNDEF | 1 | 0.0 |
| T8 | 100 | 100 | 1 | 1 | UNDEF | UNDEF | 1 | 0.0 |
| E9 | 100 | 100 | 1 | 1 | UNDEF | UNDEF | 1 | 0.0 |
| T10 | 100 | 100 | 1 | 1 | UNDEF | UNDEF | 1 | 0.0 |
| E11 | 50 | 75 | 0 | 1 | UNDEF | UNDEF | 0.5 | 0.7 |
| T12 | 50 | 75 | 0 | 1 | UNDEF | UNDEF | 0.5 | 0.7 |

Statistical data table (ST2)

| Num Regist | 0 | | | | | | | |
|---|---|---|---|---|---|---|---|---|
| | SumOcc | SumOcc2 | MinOcc | MaxOcc | OldOffset | NumSib | Average | Standard deviation |
| D13 | 0 | 0 | 0 | 0 | 0 | 0 | 0 | 0 |
| E14 | 0 | 0 | 0 | 0 | 1 | 0 | 0 | 0 |
| T15 | 0 | 0 | 0 | 0 | 2 | 0 | 0 | 0 |
| E16 | 0 | 0 | 0 | 0 | 3 | 0 | 0 | 0 |
| E17 | 0 | 0 | 0 | 0 | 4 | 1 | 0 | 0 |
| E18 | 0 | 0 | 0 | 0 | 5 | 0 | 0 | 0 |
| T19 | 0 | 0 | 0 | 0 | 6 | 0 | 0 | 0 |
| E20 | 0 | 0 | 0 | 0 | 7 | 0 | 0 | 0 |
| T21 | 0 | 0 | 0 | 0 | 8 | 0 | 0 | 0 |
| E22 | 0 | 0 | 0 | 0 | 9 | 0 | 0 | 0 |
| E23 | 0 | 0 | 0 | 0 | 10 | 0 | 0 | 0 |
| T24 | 0 | 0 | 0 | 0 | 11 | 0 | 0 | 0 |
| E25 | 0 | 0 | 0 | 0 | 12 | 0 | 0 | 0 |
| T26 | 0 | 0 | 0 | 0 | 13 | 0 | 0 | 0 |
| E27 | 0 | 0 | 0 | 0 | UNDEF | UNDEF | 0 | 0 |
| T28 | 0 | 0 | 0 | 0 | UNDEF | UNDEF | 0 | 0 |

FIG. 27

Statistical data table (ST1)

| Num Regist | | | | | | | | |
|---|---|---|---|---|---|---|---|---|
| | SumOcc | SumOcc2 | MinOcc | MaxOcc | OldOffset | NumSib | Average | Standard deviation |
| D2 | 0 | 0 | 0 | 0 | UNDEF | UNDEF | 0 | 0 |
| E3 | 0 | 0 | 0 | 0 | UNDEF | UNDEF | 0 | 0 |
| T4 | 0 | 0 | 0 | 0 | UNDEF | UNDEF | 0 | 0 |
| E5 | 0 | 0 | 0 | 0 | UNDEF | UNDEF | 0 | 0 |
| E6 | 0 | 0 | 0 | 0 | UNDEF | UNDEF | 0 | 0 |
| E7 | 0 | 0 | 0 | 0 | UNDEF | UNDEF | 0 | 0 |
| T8 | 0 | 0 | 0 | 0 | UNDEF | UNDEF | 0 | 0 |
| E9 | 0 | 0 | 0 | 0 | UNDEF | UNDEF | 0 | 0 |
| T10 | 0 | 0 | 0 | 0 | UNDEF | UNDEF | 0 | 0 |
| E11 | 0 | 0 | 0 | 0 | UNDEF | UNDEF | 0 | 0 |
| T12 | 0 | 0 | 0 | 0 | UNDEF | UNDEF | 0 | 0 |

FIG. 28

Statistical data table (ST2)

| Num Regist | SumOcc | SumOcc2 | MinOcc | MaxOcc | OldOffset | NumSib | Average | Standard deviation |
|---|---|---|---|---|---|---|---|---|
| D13 | 100 | 100 | 1 | 1 | 0 | 0 | 1 | 0.0 |
| E14 | 100 | 100 | 1 | 1 | 1 | 0 | 1 | 0.0 |
| T15 | 100 | 100 | 1 | 1 | 2 | 0 | 1 | 0.0 |
| E16 | 100 | 100 | 1 | 1 | 3 | 0 | 1 | 0.0 |
| E17 | 100 | 100 | 1 | 1 | 4 | 1 | 1 | 0.0 |
| E18 | 100 | 100 | 1 | 1 | 5 | 0 | 1 | 0.0 |
| T19 | 100 | 100 | 1 | 1 | 6 | 0 | 1 | 0.0 |
| E20 | 100 | 100 | 1 | 1 | 7 | 0 | 1 | 0.0 |
| T21 | 100 | 100 | 1 | 1 | 8 | 0 | 1 | 0.0 |
| E22 | 100 | 100 | 1 | 1 | 9 | 0 | 1 | 0.0 |
| T23 | 100 | 100 | 1 | 1 | 10 | 0 | 1 | 0.0 |
| T24 | 100 | 100 | 1 | 1 | 11 | 0 | 1 | 0.0 |
| E25 | 100 | 100 | 1 | 1 | 12 | 0 | 1 | 0.0 |
| T26 | 100 | 100 | 1 | 1 | 13 | 0 | 1 | 0.0 |
| E27 | 100 | 100 | 0 | 1 | UNDEF | UNDEF | 1 | 0.0 |
| T28 | 100 | 100 | 0 | 1 | UNDEF | UNDEF | 1 | 0.0 |
| E29 | 30 | 30 | 0 | 1 | UNDEF | UNDEF | 0.3 | 0.5 |

| Num Regist | 100 | | | | | | | | |
|---|---|---|---|---|---|---|---|---|---|
| | SumOcc | SumOcc2 | MinOcc | MaxOcc | OldOffset | NumSib | Average | Standard deviation |
| D30 | 0 | 0 | 0 | 10 | 0 | 0 | 0 | 0.0 |
| E31 | 0 | 0 | 0 | 0 | 1 | 0 | 0 | 0.0 |
| T32 | 0 | 0 | 0 | 0 | 2 | 0 | 0 | 0.0 |
| E33 | 0 | 0 | 0 | 0 | 3 | 0 | 0 | 0.0 |
| E34 | 0 | 0 | 0 | 0 | 4 | 1 | 0 | 0.0 |
| E35 | 0 | 0 | 0 | 0 | 5 | 0 | 0 | 0.0 |
| T36 | 0 | 0 | 0 | 0 | 6 | 0 | 0 | 0.0 |
| E37 | 0 | 0 | 0 | 0 | 7 | 0 | 0 | 0.0 |
| T38 | 0 | 0 | 0 | 0 | 8 | 0 | 0 | 0.0 |
| E39 | 0 | 0 | 0 | 0 | 9 | 0 | 0 | 0.0 |
| E40 | 0 | 0 | 0 | 0 | 10 | 0 | 0 | 0.0 |
| T41 | 0 | 0 | 0 | 0 | 11 | 0 | 0 | 0.0 |
| E42 | 0 | 0 | 0 | 0 | 12 | 0 | 0 | 0.0 |
| T43 | 0 | 0 | 0 | 0 | 13 | 0 | 0 | 0.0 |
| E44 | 0 | 0 | 0 | 0 | 14 | 0 | 0 | 0.0 |
| T45 | 0 | 0 | 0 | 0 | 15 | 0 | 0 | 0.0 |
| E46 | 0 | 0 | 0 | 0 | UNDEF | UNDEF | 0 | 0.0 |

FIG. 33

Query data

| db (" DB ") //authors [ contains (.//last, "Tanaka) ] |

○ : Variable node

⟨TAG⟩ : Tag node

⟨VAL CMP⟩ : Value comparison tag node

| V0 | V1 | V2 |
|----|----|----|
| F0 | T10 | E5 |
| F0 | T21 | E16 |
| F0 | T26 | E16 |

STRUCTURED DATA STORAGE METHOD, STRUCTURED DATA STORAGE APPARATUS, AND RETRIEVAL METHOD

CROSS-REFERENCE TO RELATED APPLICATIONS

This application is based upon and claims the benefit of priority from prior Japanese Patent Application No. 2004-033493, filed Feb. 10, 2004, the entire contents of which are incorporated herein by reference.

BACKGROUND OF THE INVENTION

1. Field of the Invention

The present invention relates to a structured document database having a hierarchical logical structure, and has as its object to provide a storing method and apparatus of structured document data so as to attain a high-speed retrieval process of structured document data.

2. Description of the Related Art

Several methods of a structured data management system that stores and retrieves structured documents described in an Extensible markup language (XML) and the like have been proposed.

(1) A method of storing structured data intact as a text file as a simple method. With this method, when the number of data and the data size increase, the storage efficiency drops, and a retrieval process that exploits the features of structured documents becomes harder to achieve.

(2) A method of managing structured document data in an RDB (Relational Database).

(3) A method of managing structured document data using an OODB (Object Oriented Database) which has been developed to manage the structured document data. Backbone systems prevalently use the RDB, and for example, an XML compatible RDB that expands the RDB is commercially available as a product. Since the RDB stores data in a flat table format, complicated mapping is required to associate the hierarchical structure such as XML data and the like with the table. If prior schema design for this mapping is insufficient, performance drop may occur.

In recent years, a new method has been proposed in addition to these methods (1) to (3).

(4) A method of natively managing structured document data. This method stores XML data having various hierarchical structures without any special mapping process. For this reason, no special overhead is produced upon storage or acquisition. Also, the need for prior schema design that requires high cost can be obviated, and the XML data structure can be freely changed as needed in correspondence with a change in business environment.

Even if structured document data are efficiently stored, they are useless if no means for extracting stored data is available. As such means for extracting stored data, query languages are used. XQuery (XML Query Language) has been designed for XML as in SQL (Structured Query Language) for RDB. XQuery is a language used to handle XML data like a database. For this purpose, means for extracting a data set that matches a condition, and means for compiling and parsing data are provided. Also, since XML data have a hierarchical structure as a combination of parent elements, child elements, sibling elements, and the like, means for tracing such hierarchical structure is provided.

A technique for retrieving structured document data that includes a specific element and specific structure designated by a retrieval condition while tracing the hierarchical structure of the stored structured document data has already been proposed (e.g., Jpn. Pat. Appln. KOKAI Publication Nos. 2001-34618 and 2000-57163).

As the structure of the structured document data has a larger scale, the number of structured document data stored in a database is larger, and a retrieval condition becomes more complicated, a longer time is required to trace elements which form the hierarchical structure of each structured document data. Also, it becomes impossible to expand stored structured document data onto a memory with increasing number of structured document data and their sizes, and most of structured document data are stored in a secondary storage such as a hard disk or the like.

In the method of natively managing structured document data, the hierarchical structure among elements of the structured document data is stored intact. In order to check if an element or structure designated as a retrieval condition is included, elements of structured document data stored on the secondary storage must be frequently accessed. Still more accesses are required for a complicated retrieval condition.

Conventionally, in order to retrieve structured document data having a desired element or structure from a database that stores structured document data with the hierarchical structure, a high-speed retrieval process cannot be attained since structured document data having an element or structure designated by the retrieval condition is retrieved while tracing element data which form the hierarchical structure of each structured document data in the database. Especially, it becomes more difficult to attain a high-speed retrieval process with increasing size of structured document data and increasing number of structured document data to be retrieved under more complicated retrieval conditions.

BRIEF SUMMARY OF THE INVENTION

According to embodiments of the present invention, a structured data storage apparatus inputs a given number of structured data items each including respective hierarchical structures of a plurality of element data items; stores the structured data items in a memory; extracts a common hierarchical structure of a group of element data items, which is included in and common to the structured data items, from the structured data items, based on frequencies of occurrence of the group in the structured data items; inputs a structured data item to be stored, which includes the common hierarchical structure of the group; assigns element IDs corresponding to respective element data items of the group to storage areas allocated to the respective element data items of the group in a memory location of the memory, the memory location being allocated to the structured data item to be stored; stores the group included in the structured data item to be stored in storage areas in the memory location.

BRIEF DESCRIPTION OF THE SEVERAL VIEWS OF THE DRAWING

FIG. 1 shows a practical example of structured document data;

FIG. 11 shows a statistical data table of the structure template ST1;

FIG. 18 shows an example of structured document data to be stored in a "bookFolder" folder;

FIG. 19 shows the state of the statistical data table of the structure template ST1 upon storing the structured document data shown in FIG. 18;

FIG. 20 shows an example of structured document data to be stored in the "bookFolder" folder;

FIG. 21 shows the state of the statistical data table of the structure template ST1 upon storing the structured document data shown in FIG. 20;

FIG. 27 shows an initial state of a statistical data table of the structure template ST2;

FIG. 28 shows an initial state of a statistical data table of the structure template ST1;

FIG. 33 shows an initial state of a statistical data table of the structure template ST3;

FIG. 38 shows an example of query data;

FIG. 39 shows a query graph obtained from the query data shown in FIG. 38;

FIG. 40 shows three combinations of TIDs obtained for variables V0 to V2 shown in FIG. 39;

DETAILED DESCRIPTION OF THE INVENTION

Preferred embodiments of the present invention will be described hereinafter with reference to the accompanying drawings.

FIG. 1 shows an example of structured document data (structured data). XML (eXtensible Markup Language) is known as a typical language used to describe structured documents. The structured document shown in FIG. 1 is described using XML. In XML, individual parts which form a document structure are called "elements", which are described using tags. More specifically, one element is expressed by bounding text data between two tags, i.e., a tag indicating the start of the element (start tag) and a tag indicating the end of the element (end tag). Note that the text data bounded between the start and end tags is a text element included in one element expressed by these start and end tags.

In this example, a root element of elements is bounded by <book> tags. This "book" element includes three child elements bounded by <title>, <authors>, and tags. The "authors" element includes two child elements having <author> tags. Each "author" element includes child elements bounded by <first> and <last> tags. The "first" and "last" elements respectively have text elements "Taro", "Tanaka", and the like.

Figure 2:
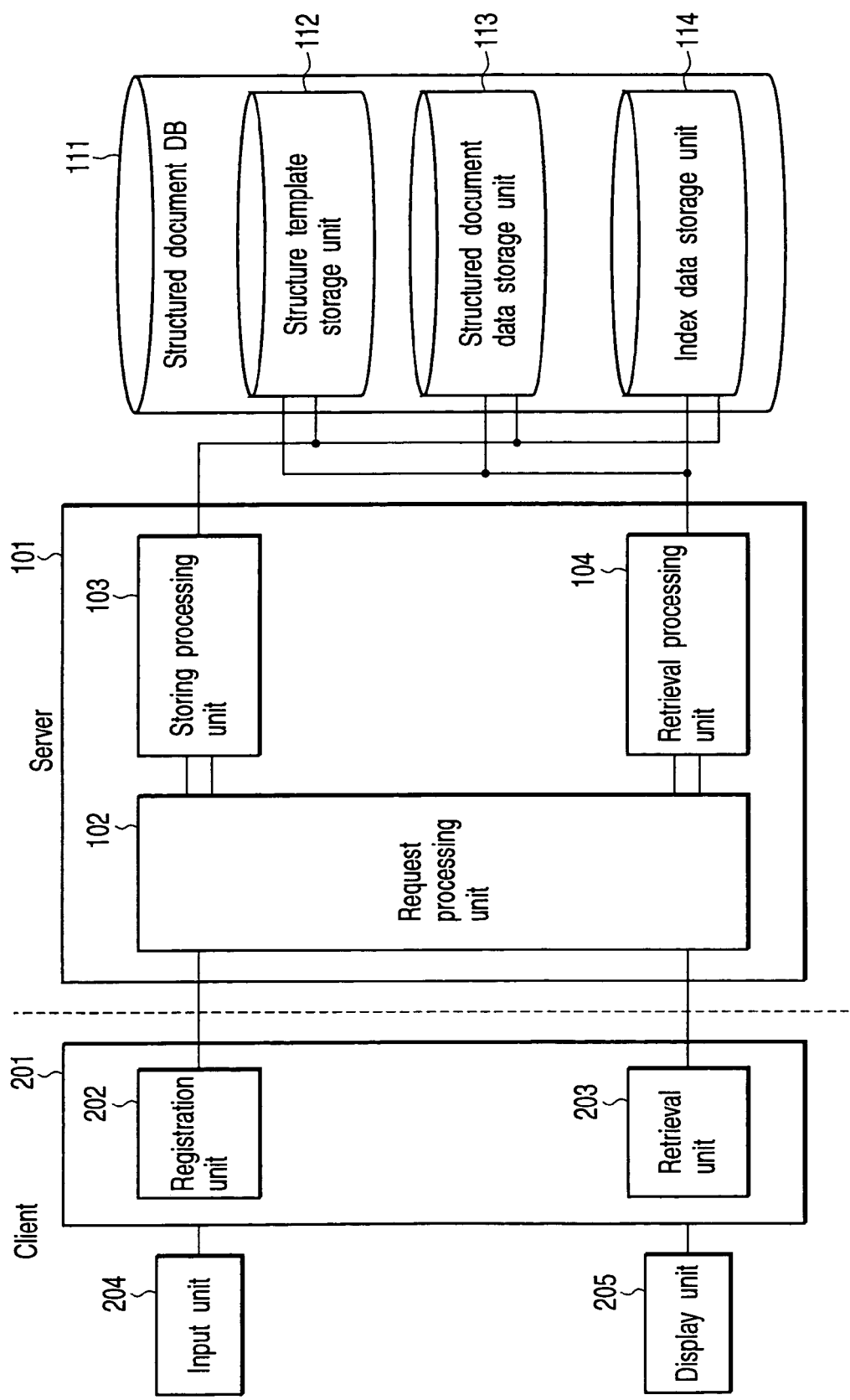
FIG. 2 is a block diagram showing an example of the functional arrangement of a structured document management system.

FIG. 2 shows an example of the functional arrangement of a structured document management system according to this embodiment. The structured document management system roughly comprises a client 201 and server 101. In response to a storing request or retrieval request from the client 201, the server 101 executes a process corresponding to such request.

The client 201 mainly comprises a registration unit 202, retrieval unit 203, input unit 204, and display unit 205. The input unit 204 comprises input devices such as a keyboard, mouse, and the like, and is used to input a structured document and various instructions. The registration unit 202 registers a structured document input from the input unit 204 and that which is pre-stored in a storage device or the like of the client 201 in a structured document database 111. The registration unit 202 transmits a storing request to the server 101 together with a structured document to be registered.

The retrieval unit 203 generates query data which describes a retrieval condition and the like used to retrieve desired data from the structured document database 111 in accordance with an instruction input by the user from the input unit 204, and transmits a retrieval request including the query data to the server 101. Also, the retrieval unit 203 receives retrieval result data corresponding to the transmitted retrieval request from the server 101, and displays it on the display unit 205.

The server 101 comprises a request processing unit 102, storing processing unit 103, and retrieval processing unit 104. Also, the structured document database (structured document DB) 111 is connected to the server 101. The structured document database 111 comprises a structure template storage unit 112, structured document data storage unit 113, and index data storage unit 114.

The request processing unit 102 discriminates the storing request and retrieval request transmitted from the client 201, and distributes processes to the storing processing unit 103, retrieval processing unit 104, and the like. Also, the request processing unit 102 returns the processing results of the storing processing unit 103 and retrieval processing unit 104 to the client 201.

Figure 3:
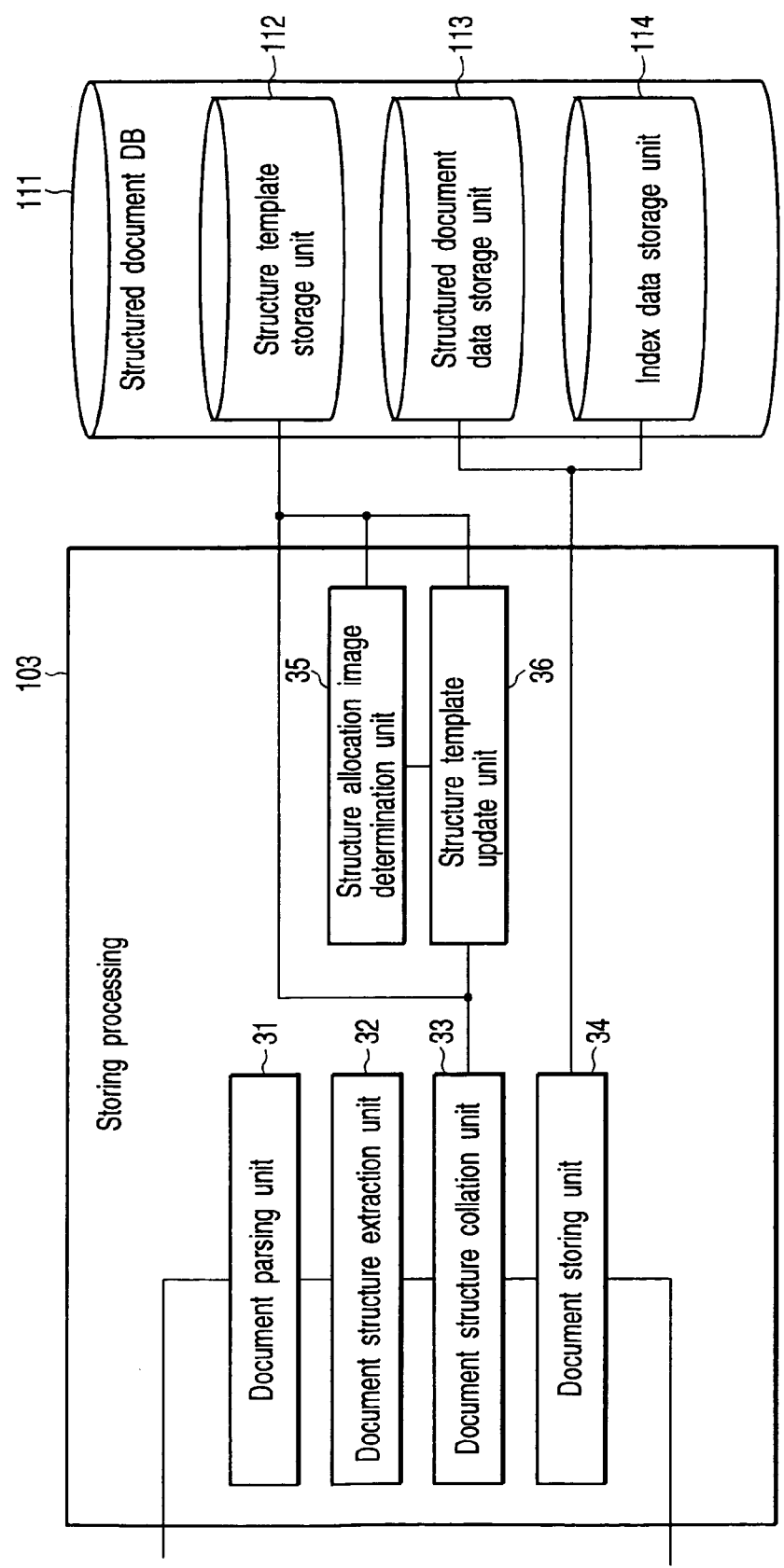
FIG. 3 is a block diagram showing an example of the functional arrangement of a storage processing unit.

The storing processing unit 103 executes a process for storing a structured document transmitted from the client 201 in response to the storing request received from the client 201. The storing processing unit 103 comprises a document parsing unit 31, document structure extraction unit 32, document structure collation unit 33, document storing unit 34, structure allocation image determination unit 35, and structure template update unit 36, as shown in FIG. 3.

The document parsing unit 31 parses a structured document passed from the request processing unit 102, and obtains an object tree like, e.g., a DOM (Document Object Model) as a parsing result. The structured document structure extraction unit 32 extracts the (document) structure of the structured document of interest on the basis of the parsing result. The document structure collation unit 33 selects one structure template which is most similar to (matches) the structure extracted by the document structure extraction unit 32 from those stored in the structured document database 111.

The structure template update unit 36 updates the structure template selected by the document structure collation unit 33 so that it reflects the structure extracted by the document structure extraction unit 32. The structure template storage unit 112 holds statistical data such as the frequencies of occurrence of structures in addition to graph data indicating structures, and the structure template update unit 36 updates both the graph data and statistical data. When a typical structure pattern appears on a structure template in statistical data, that typical structure pattern is stored in the structure template storage unit 112 as a new structure template.

The structure allocation image determination unit 35 locates structured document data that matches the structure pattern on the allocation.

The document storing unit 34 stores data of the structured document in the structured document data storage unit 113 of the structured document database 111, and stores index data in the index data storage unit 114.

Figure 4:
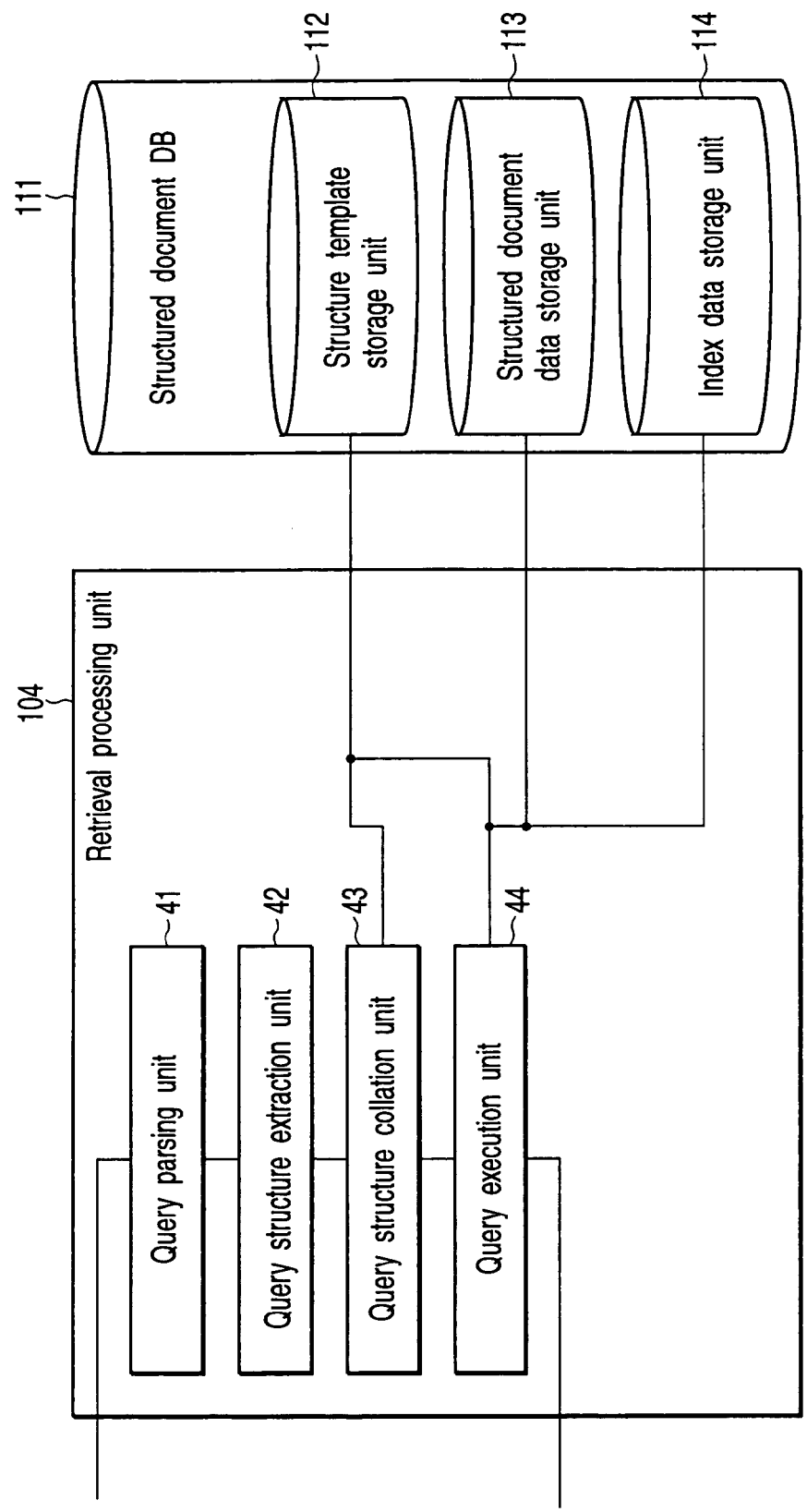
FIG. 4 is a block diagram showing an example of the functional arrangement of a retrieval processing unit.

The retrieval processing unit 104 executes a process for retrieving data that matches the designated condition (query data) from the structured document database 111 upon reception of the retrieval request from the client 201, and returning the retrieved data to the client 201 as retrieval result data. The retrieval processing unit 104 comprises a query parsing unit 41, query structure extraction unit 42, query structure collation unit 43, and query execution unit 44, as shown in FIG. 4.

The query parsing unit 41 parses query data passed from the request processing unit 102, and obtains a query graph (to be described later) as a parsing result. The query structure extraction unit 42 extracts the structure of that query data (query structure) on the basis of the parsing result.

The query structure collation unit 43 extracts a set of structure templates which are similar to (match) the query structure from those stored in the structure template storage unit 112 of the structured document database. The collation result of the query structure and structure template set is expressed as combinations of structure patterns that a variable set generated in the query graph can assume.

The query execution unit 44 accesses structured document data stored in the structured document data storage unit 113 and lexical index data stored in the index data storage unit 114 of the structured document database 111 on the basis of the collation result of the query structure collation unit 43, and generates result data which matches the condition described in the query data.

Figure 5:
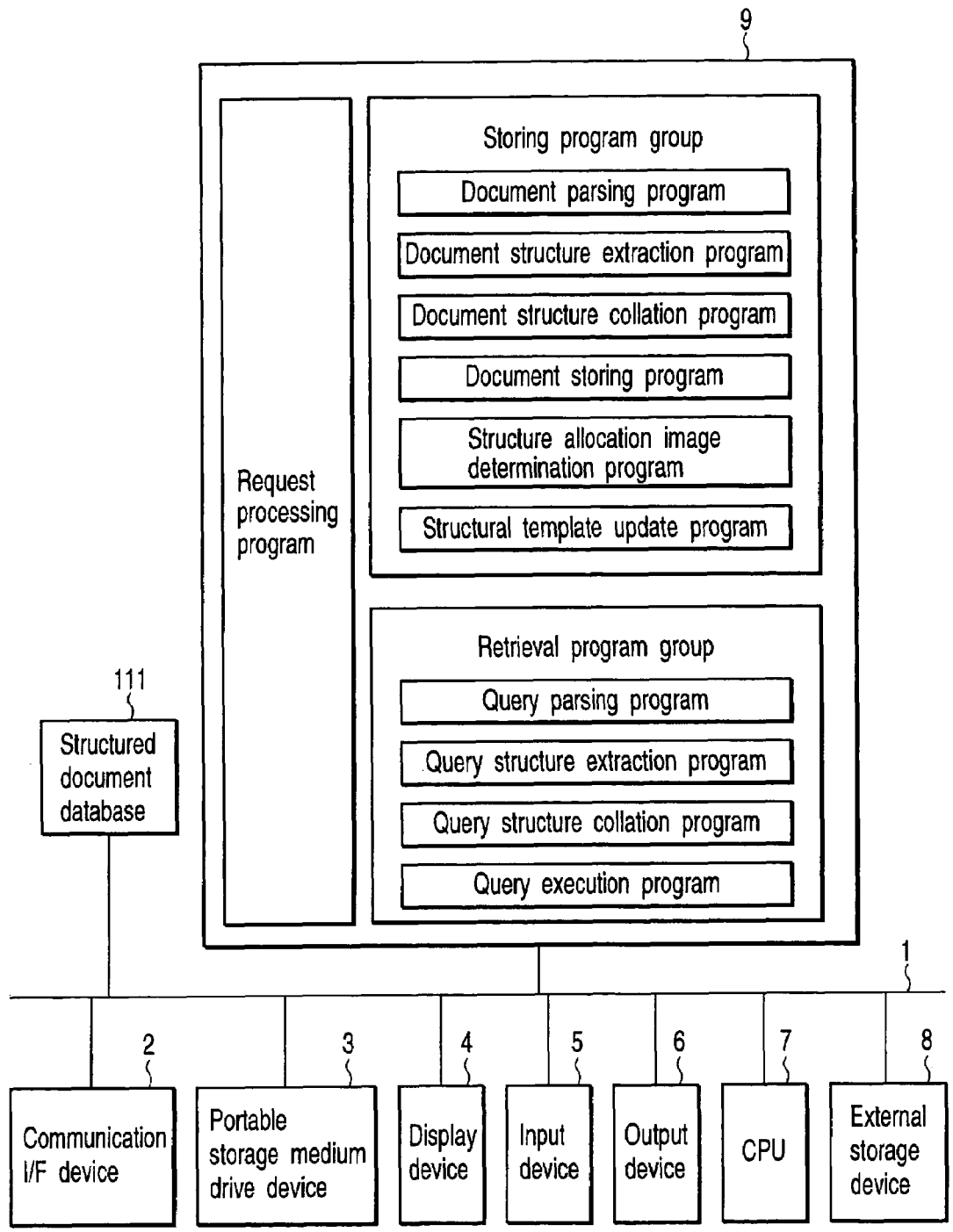
FIG. 5 is a block diagram showing an example of the hardware arrangement of a server.

FIG. 5 shows an example of the hardware arrangement of the server 101. To a bus 1, a communication I/F device 2, portable recording medium drive device 3, display device 4, input device 5, output device 6, arithmetic device (CPU) 7, external storage device 8, and memory 9 are connected. Furthermore, in the arrangement shown in FIG. 5, the structured document database 111 in FIG. 2 is connected to the bus 1.

Programs, which respectively implement the functions of the request processing unit 102, storing processing unit 103, and retrieval processing unit 104 in FIG. 2, are pre-stored in the external storage device 8 in FIG. 5, and are loaded onto the memory 9 as needed when they are executed by the CPU 7. Note that the following description will be given with reference to FIGS. 2 to 4.

The structured document data storage unit 113 and index data storage unit 114 will be described below.

Figure 6:
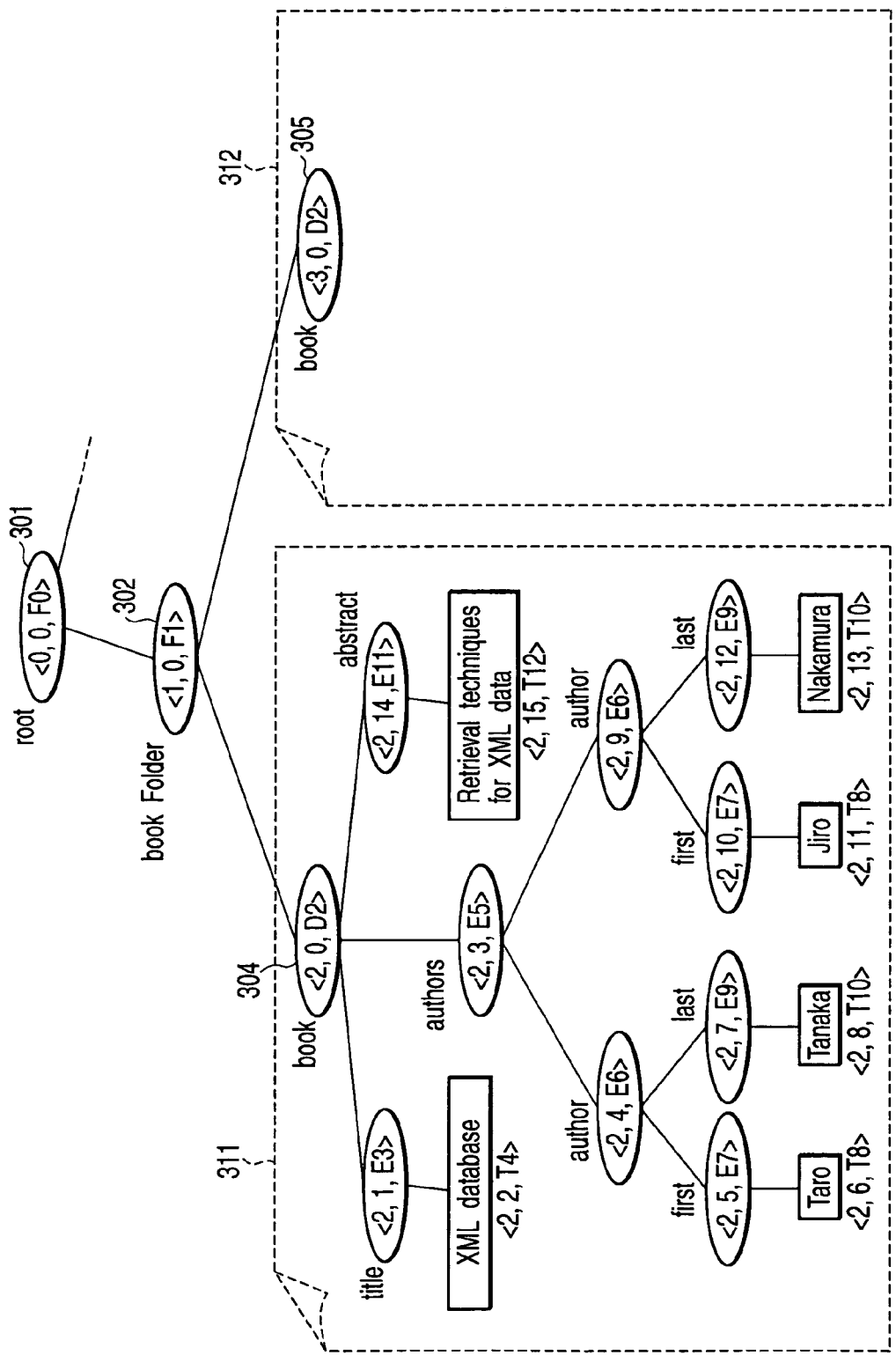
FIG. 6 illustrates the data structure of a structured document data storing unit.

FIG. 6 illustrates the data structure of the structured document data storage unit 113. The structured document data storage unit 113 logically stores a large number of structured documents as partial documents of one structured document having a "root" node 301 as a root. FIG. 6 expresses the structure of one structured document having the "root" node 301 as a root by a hierarchical tree formed of nodes and arcs. Each node indicates an element (including a text element) of a structured document, and an arc indicates the parent-child relationship between elements. Upon implementation, nodes are stored in the structured document data storage unit 113 as files of object data. Identifiers called object Ids (OIDs) are assigned to respective nodes. As will be described later, each OID includes a document ID (DocID), element ID (ElemID), and template ID (TID), and is expressed using a format <DocID, ElemID, TID> in this specification. By designating the OID, desired object data can be extracted.

The arcs which represent the parent-child relationship among nodes are links among object data, which are stored in the structured document data storage unit 113 as an OID sequence indicating an object set of child elements in object data.

Under the "root" node 301, a "bookFolder" node 302 is present. Under the "bookFolder" node, two "book" nodes 304 and 305 are present. The "book" node 304 with the OID <2, 0, D2> stores structured document data 311 shown in FIG. 1.

In this manner, data under the "root" node form one large structured document data which includes elements of a plurality of structured documents. The structured document data shown in FIG. 1 is stored as a part of the large structured document data. For example, the structured document <book> . . . </book> in FIG. 1 can be expressed by <root><bookFolder><book> . . . </book></bookFolder></root> in the structured document shown in FIG. 6.

When such hierarchical structure including a plurality of nodes is applied to a directory structure which is prevalently adopted in a versatile OS, these nodes correspond to folders and files in the directory structure. That is, the hierarchical structure shown in FIG. 6 is stored in the structured document data storage unit 113 to have a directory structure which includes a child folder "bookFolder" under a "root" folder, and two document files 311 and 312 each having a "book" element as a root under the "bookFolder" folder.

In the following description, the "root" node, "bookFolder" node, and "paperFolder" node will be interpreted as folders, and data under these folders will be interpreted as document files together. For example, in case of FIG. 6, it can be interpreted that the "bookFolder" folder stores two "book" documents (files 311 and 312).

In order to execute a retrieval process of the structured document DB 111, query data must be given. The query data includes one which designates text (a character string such as a word or the like) as a retrieval condition, one which designates the structure of a structured document as a retrieval condition, and one which designates a combination of them as a retrieval condition. When the query data includes a character string such as a word or the like as a retrieval condition, the structured document management system often assigns a lexical index to attain a high-speed retrieval process. The lexical index data is information which is used to extract text data (character string) in text elements included in stored structured document data, and indicates correspondence between the text data and the object ID (OID) of elements in structured document data including the text data.

The structured document data shown in FIG. 1 include text data such as "XML database", "retrieval technique for XML data", "Tanaka", and the like. These text data are decomposed into lexical items (character strings) "XML", "data", "database", and the like via lexical analysis.

Figure 7:
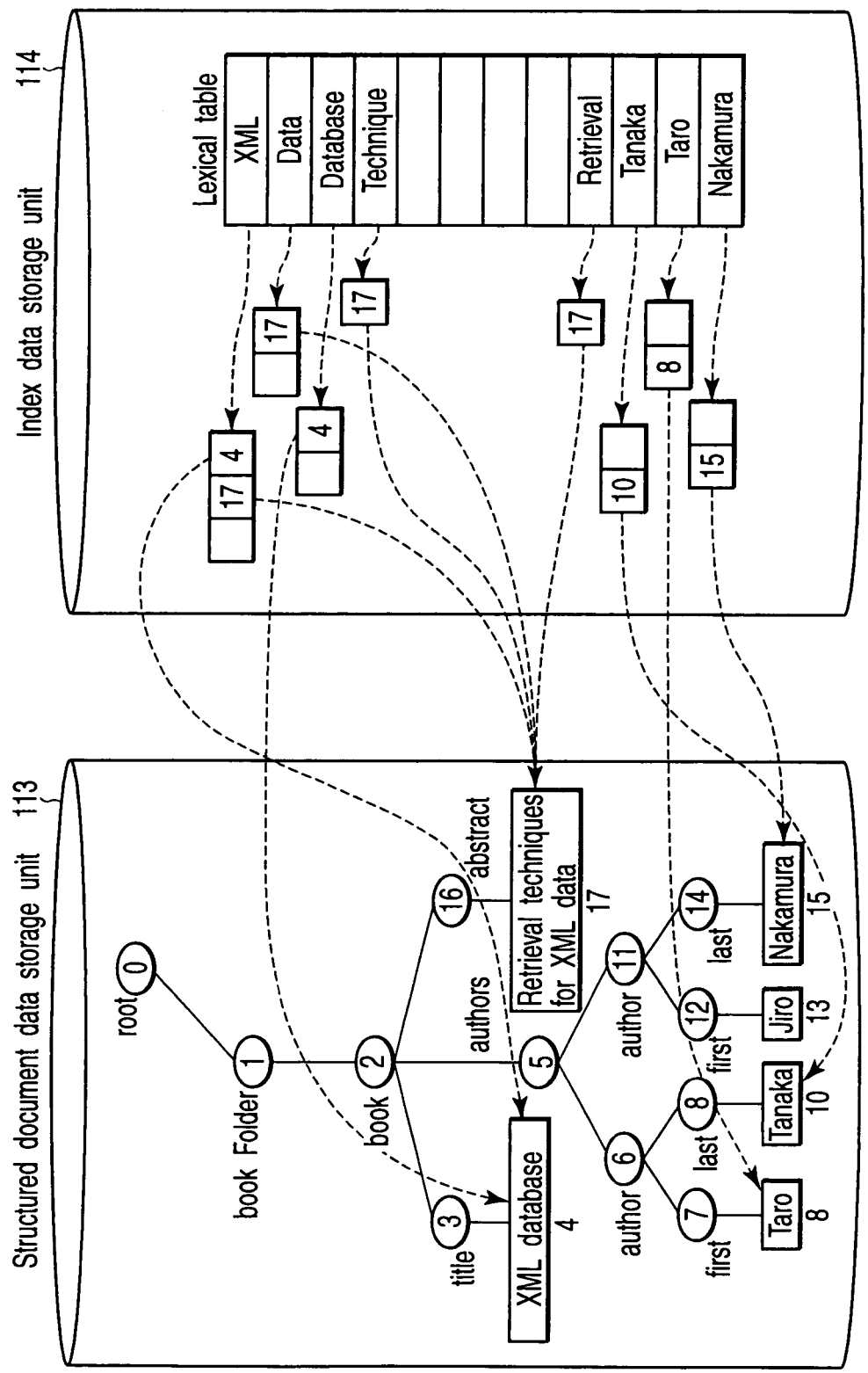
FIG. 7 is a view for explaining index data.

The index data storage unit 114 stores a lexical table and a plurality of tables which are linked with lexical items in the lexical table and record the OIDs of text elements which include the lexical items, as shown in FIG. 7. By tracing a link from a given lexical item in the lexical table, the location of occurrence of a text element including that lexical item, i.e., the OID, can be obtained.

Figure 8:
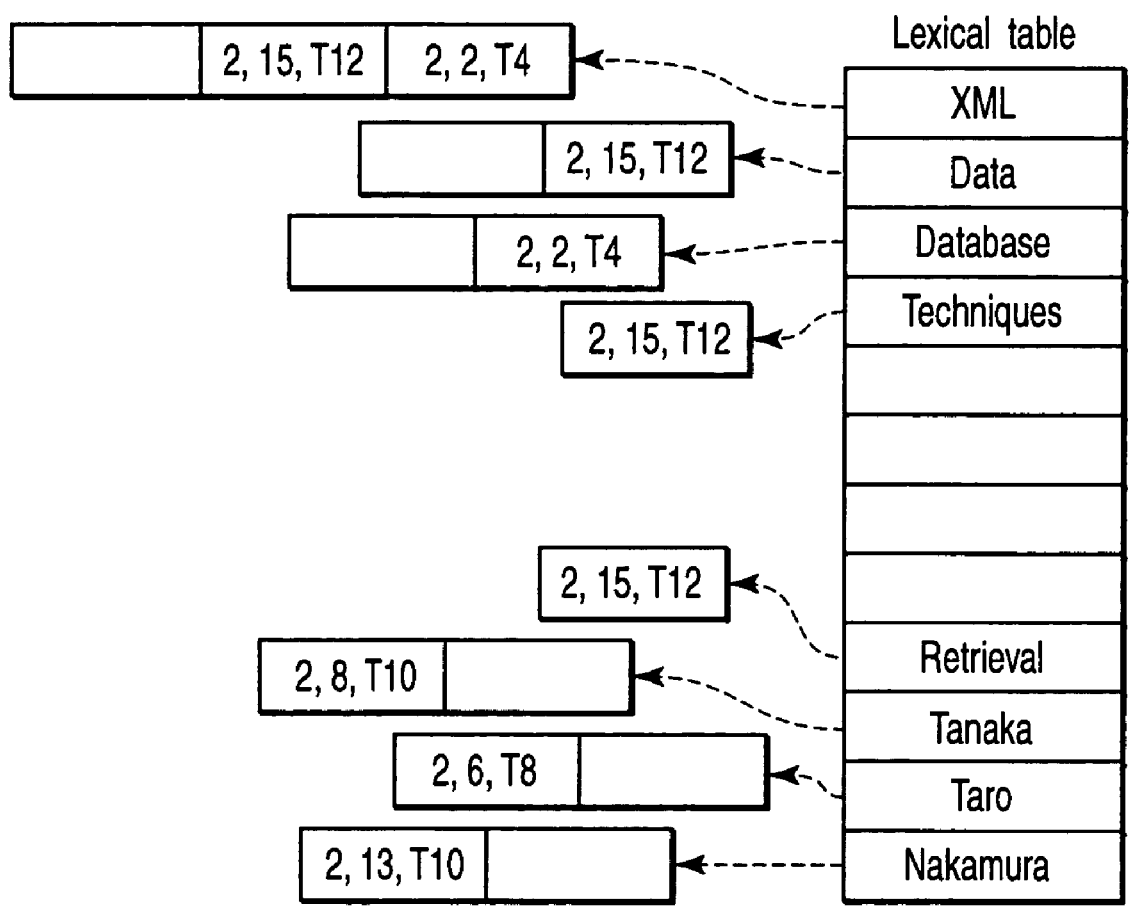
FIG. 8 illustrates the data structure of an index data storage unit.

Although not shown in the index data shown in FIG. 7, a table linked with each lexical item in the lexical table records the OIDs of a text element including that lexical item in the form of <DocID, ElemID, TID>, as shown in FIG. 8.

The structure template storage unit 112 stores structure template data. The structure template data stores structure data extracted from structured document data stored in the structured document data storage unit 113. Initial template data stored in the structure template storage unit 112 is extracted from a structured document stored (e.g., first) in the structured document data storage unit 113.

Figure 9:
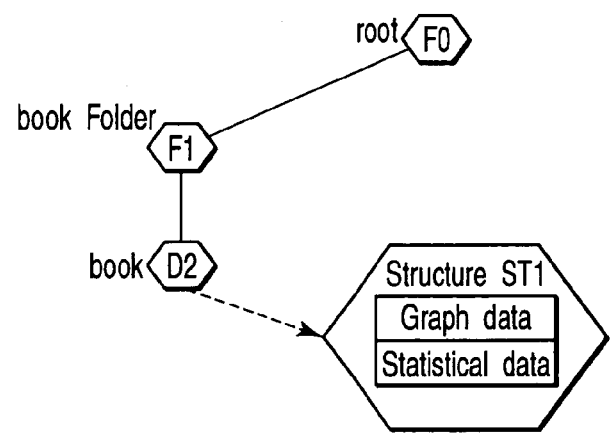
FIG. 9 illustrates a hierarchical structure stored in a structure template storage unit.

FIG. 9 shows the hierarchical structure (including structured document data stored in the structured document data storage unit 113) stored in the structure template storage unit 112. FIG. 9 expresses the hierarchical structure including two elements "root" and "bookFolder" corresponding to the two nodes 301 and 302, i.e., "root" and "bookFolder", and an element "book" corresponding to the document file of the structured document stored under the "bookFolder" node 302.

At least one structure template data which represents a document structure as a basis (reference) of that of the structured document stored under the "bookFolder" node 302 is stored in association with the "book" element.

Figure 10:
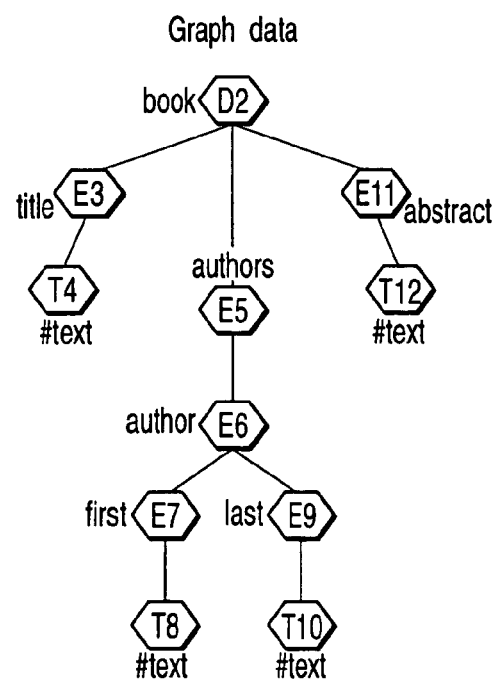
FIG. 10 shows one practical example of a structure template (graph data) ST1 stored in the structure template storage unit.

FIG. 9 shows a case wherein an initial structure template ST1 is stored in association with the "book" element. The structure template (data) includes graph data and statistical data. FIG. 10 shows graph data, and FIG. 11 shows a statistical data table that records statistical data. In the following description, only graph data of statistical data and graph data will be called a structure template (data).

The initial structure template ST1 shown in FIG. 10 represents a structure extracted from the document shown in FIG. 1. The structured document in FIG. 1 includes the "authors" node immediately under the "book" node, and includes two "author" nodes under that node. However, in the structure template in FIG. 10, the "author" nodes are combined into one node, and text nodes (text elements) are expressed as "#text" nodes.

Respective nodes (which correspond to folders, files, elements, and text elements) expressed by hexagons in the structure template data shown in FIGS. 9 and 10 are assigned unique IDs "F0", "D2", "E3", "T4", and the like. The IDs, which are assigned to the respective nodes so as to identify the types and positions on the structure of respective nodes of the structure template data, will be referred to as template IDs (TIDs) hereinafter.

The template ID will be described below. The template ID includes information which indicates the type of node of interest on the structure template, and a number which is used to identify each node among nodes of the same type. The node types are expressed by four letters "F", "D", "E", and "T". "F" represents a folder, "D" represents a document file, "E" represents an element (which is not a text element), and "T" represents a text element. With the template ID which includes the letter indicating the node type and the following number "x", the type of node of interest, and which of nodes on the structure template the node with that template ID corresponds to can be identified.

A node with a template ID "Fx" represents a folder, and is called a folder type structure template node. A node with a template ID "Dx" represents a document, and is called a document type structure template node. A node with a template ID "Ex" represents an element (which is not a text element) in the document, and is called an element type structure template node. A node with a template ID "Tx" represents a text element in the document, and is called a text type structure template node. Note that "x" is a serial integer which is unique to each node of the structure template data.

Respective elements (nodes) of structured document data stored in the structured document data storage unit 113 are assigned object IDs (OIDs) used to identify these nodes. The OID of each node of structured document data stored in a data file includes a document ID (DocID), an element ID (ElemID), and the template ID (TID). In this embodiment, the OID is expressed by <DocID, ElemID, TID>.

The DocID is a unique ID in a data file, which is assigned to a document or folder, and is an identifier of a document file or folder. The ElemID is a unique ID in each document, which is assigned to each element in the document. With the ElemID, each element in the document can be identified. The TID is the ID of a node in the structure template data, i.e., the template ID, as described above.

By checking the OID of a given element in a document file, a document file including the node having that OID can be identified from the DocID included in the OID, the location of that node in the structure template and the node type can be identified from the TID included in that OID, and the location of that node in the document can be identified from the ElemID.

The statistical data table shown in FIG. 11 represents the frequencies or concurrencies of (template IDs of) respective elements in the structure template in FIG. 10 in the structured document data group, which is stored in the structured document data storage unit 113 while being assigned with the template IDs and element IDs on the basis of the structure template in FIG. 10.

For example, the statistical data table shown in FIG. 11 expresses NumRegist which is the total number of structured document data stored in the structured document data storage unit 113 on the basis of the structure template in FIG. 10, SumOcc which is the total sum of the number of occurrences (frequency of occurrence) of respective elements expressed by the structure template in FIG. 10 in respective structured document data of the structured document data group of interest, SumOcc2 which is square value of the SumOcc, MinOcc which is the minimum number of occurrences of the element of interest in one structured document data, MaxOcc which is the maximum number of occurrences of the element of interest in one structured document data, and the like.

The statistical data table in FIG. 11 is updated every time new structured document data with a structure expressed by the structure template in FIG. 10 is stored in the structured document data storage unit 113.

When a new structure template is extracted from the structure template in FIG. 10, the average values and standard deviations of the values obtained for respective elements are referred to.

F Each of fixed allocation elements (to be described later) of elements of the structure template is determined in advance an element ID which is recorded in an "OidOffset" column for such fixed allocation element in the statistical data table. When the number of times of repetitive occurrence of that fixed allocation elements as child elements of a given parent element is determined in advance, that number of times of repetition is recorded in a "NumSib" column. Since elements of the statistical data table in FIG. 11 do not include any fixed allocation element, "UNDEFF" (undefined) is recorded in all the fields of the "OidOffset" and "NumSib" columns.

The processing operation of the storing processing unit 103 in FIG. 2 will be described below with reference to the flowcharts shown in FIGS. 12 to 14.

The registration unit 202 of the client 201 transmits new structured document data to be stored, and a storing request message which includes the OID of a folder as the storage destination of this structured document data. Note that OIDp represents the OID of the storage destination folder.

Note that the client 201 can obtain the OID of the storage destination folder as follows. The retrieval unit 203 of the client 201 has a GUI function used to display a schematic structure of the structured document data storage unit 113, as shown in, e.g., FIG. 6. When the user designates a desired node (folder) as the storage destination folder from the structure displayed by this GUI function, query data required to obtain the OID corresponding to that node is generated, and is transmitted to the server 101. The server 101 acquires the OID of the designated node on the basis of the query data, and returns it to the retrieval unit 203 of the client 201. The retrieval unit 203 passes the obtained OID (i.e., OIDp) to the registration unit 202.

The request processing unit 102 of the server receives a storing request message which includes new structured document data to be stored and the OIDp of the storage destination folder (step S1). A case will be examined below wherein, for example, the OIDp (<1, 0, F1>) corresponding to the "book-Folder" 302 is designated as the storage destination folder, and a new document is to be stored under this folder.

The structured document data to be stored, which is included in the storing request message, is passed to the document parsing unit 31 of the storing processing unit 103, and is parsed. As a result, a hierarchical structure including a plurality of object data of the structured document data is obtained, and is mapped on the memory (step S2). More specifically, the document parsing unit 31 has a function corresponding to an XML parser which applies a parsing process to the structured document data as XML data to map that data into object data in the DOM (Document Object Model) format.

Furthermore, a new document ID (DocID) is assigned to that structured document data (step S3).

The document structure extraction unit 32 extracts the structure of the structured document data, i.e., a plurality of nodes corresponding to elements in the structured document data and a structure made up of the plurality of nodes, by tracing the parsing result of the document parsing unit 31 from its root. Let Sc be the structure of the structured document data (step S4).

The document structure collation unit 33 acquires a set of structure templates from the structure template storage unit 112 using the OIDp of the storage destination folder as a key. For example, if the OIDp is <1, 0, F1>, the unit 33 acquires the TID "F1". Let TIDp be the TID acquired from this OIDp. The document structure collation unit 33 acquires a corresponding set of structure templates by scanning the structure template storage unit 112 using the TIDp as a key (step S5). Let Sps be the acquired set of structure templates (step S6).

Figure 14:
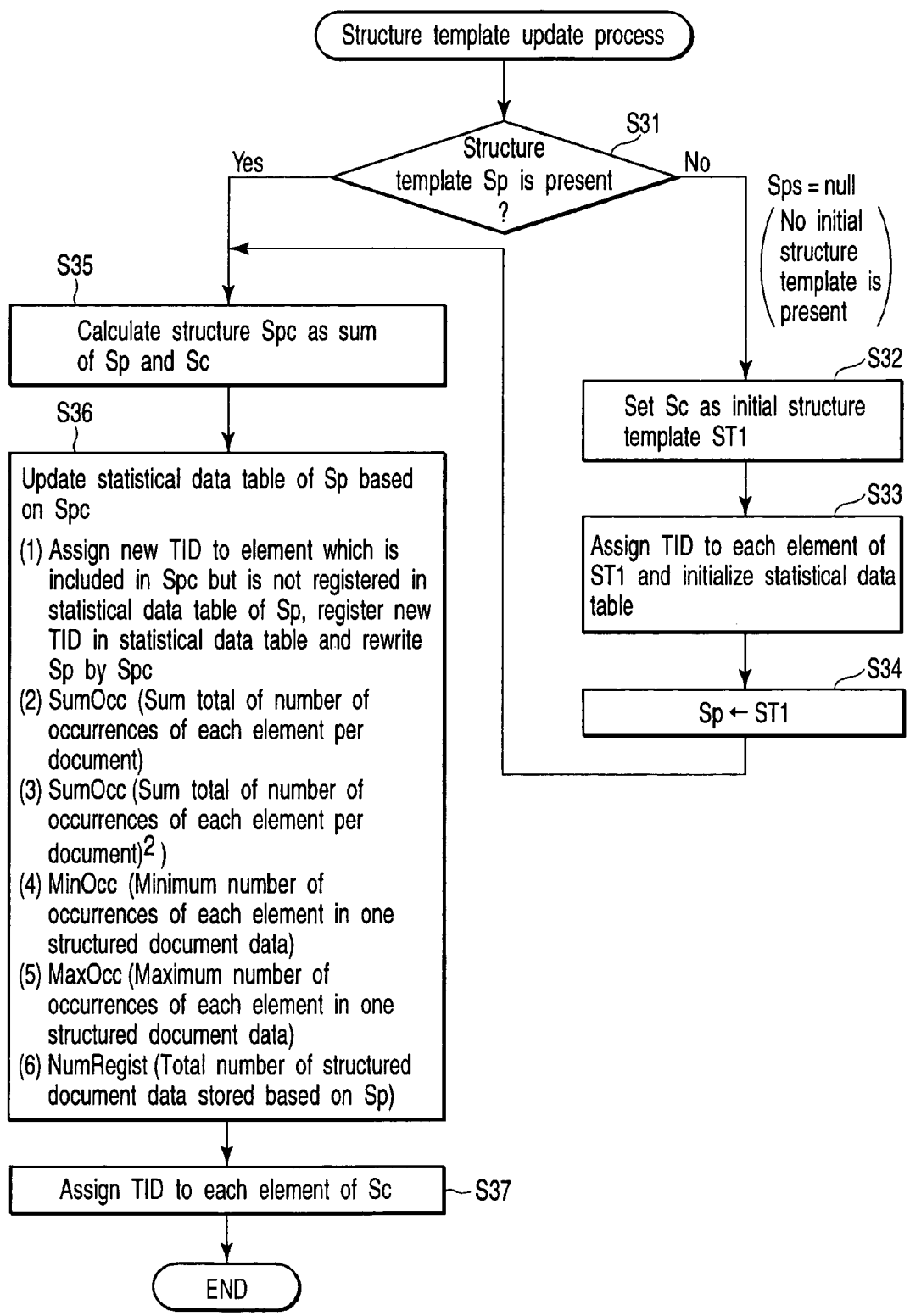
FIG. 14 is a flowchart for explaining a structure template update processing operation.

If the acquired set Sps of structure templates is empty (null) (step S7), since the storage destination folder does not include any structure template, the flow advances to step S11 to create an initial structure template in that storage destination folder, and a structure template update process shown in FIG. 14 is executed. If Sps is not null (step S7), the flow advances to step S8. In step S8, each of structure templates in Sps is collated with the structure Sc extracted from the new structured document data to be stored to select a structure template which is most similar to Sc from Spc (step S8). Let Sp be the selected structure template (step S9). The structure template update process in FIG. 14 is executed using Sc and Sp (step S10).

FIG. 14 is a flowchart for explaining the structure template update processing operation by the structure template update unit 36. If Spc is null in step S7 in FIG. 12 (the structure template update process in step S11), an initial structure template is created. That is, the flow advances from step S31 to step S32 in FIG. 14, and the structure Sc extracted from the new structured document data is set as an initial structure template ST1 (step S32). A new TID is assigned to respective elements of this initial structure template ST1, and the statistical data table of the initial structure template is initialized (step S33). After that, let Sp be that initial structure template (step S34). The flow then advances to step S35.

On the other hand, if the structure template Sp has already been obtained (the structure template update process in step S10 in FIG. 12), the flow advances from step S31 to step S35 in FIG. 14.

In step S35, the sum of the structure template Sp and the structure Sc extracted from the new structured document data to be stored is calculated. Let Spc be this sum. Since the sum of structures is calculated, Spc is a structure template that represents a structure obtained by adding elements which are present in Sc but are not present in Sp to the structure template Sp.

Next, the statistical data table of Sp is updated based on the structure template Spc (step S36). The update contents are as follows. That is, (1) if there is an element which is present in Spc but is not registered in the statistical data table of Sp, a new TID is assigned to that element, and the new TID is registered in the statistical data table. Also, Sp is rewritten by graph data of Spc to update Sp itself. (2) SumOcc (the sum total of the number of occurrences of each element (TID) registered in the statistical data table of Sp) is incremented by the number of elements of that TID which appear in Spc. (3)

A square value of the number of a element of a TID that appear in Spc is added to the value of SumOcc2 for each element (TID) registered in the statistical data table of Sp. (4) If the value of MinOcc of each element (TID) registered in the statistical data table of Sp is larger than the number of occurrences of that element in Spc, the value of MinOcc is rewritten by the number of occurrences of that element in Spc. (5) If the value of MaxOcc of each element (TID) registered in the statistical data table of Sp is smaller than the number of occurrences of that element in Spc, the value of MaxOcc is rewritten by the number of occurrences of that element in Spc. (6) The value of NumRegist is incremented by 1.

Upon completion of the aforementioned update process of the statistical data table, the flow advances to step S37 to assign the TID of an element in Sp corresponding to that element of the structure Sc extracted from the new structured document data to be stored.

Figure 13:
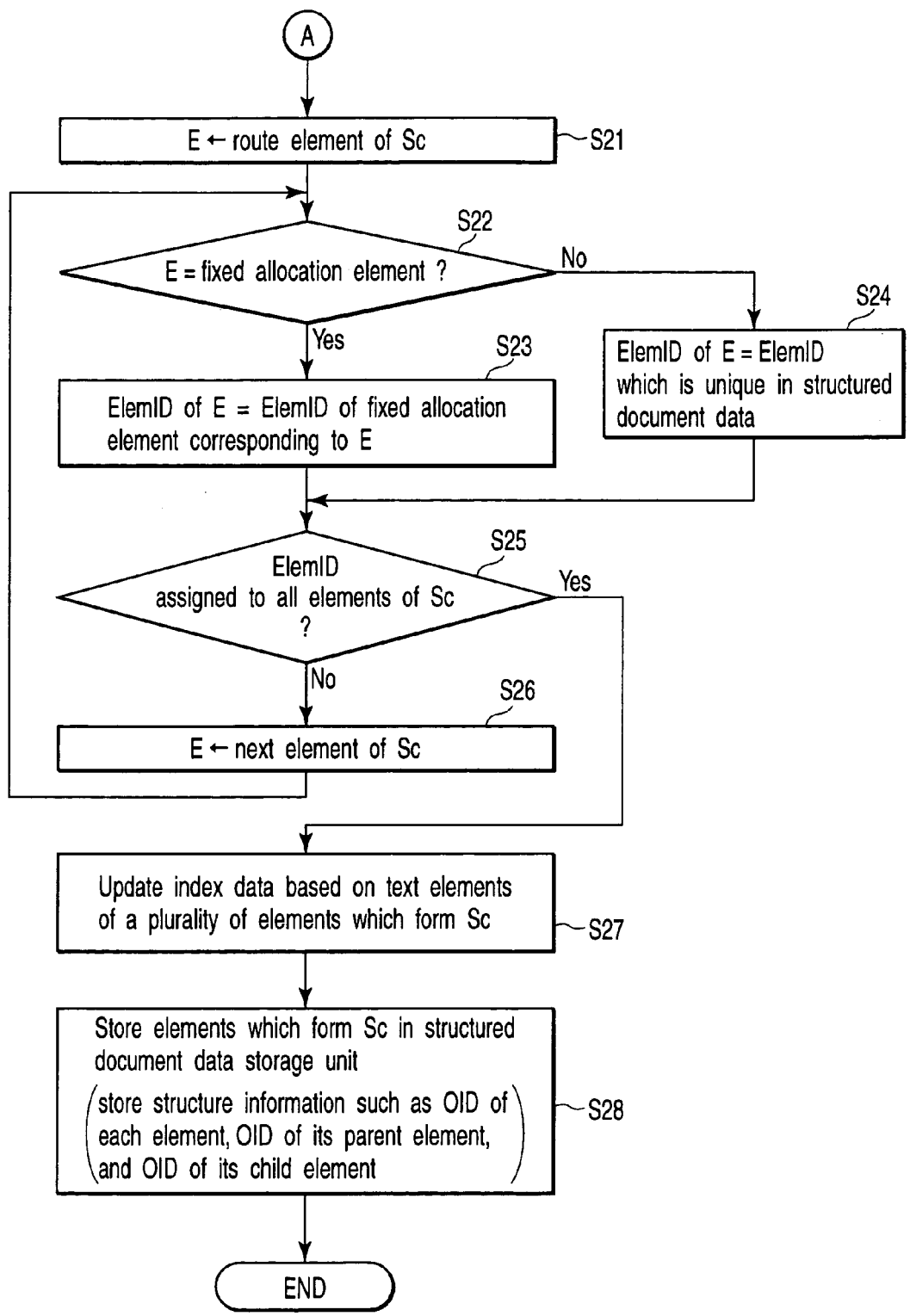
FIG. 13 is a flowchart for explaining a storage processing operation.

Upon completion of the aforementioned structure template update process, the flow advances to step S21 in FIG. 13. In FIG. 13, the document storing unit 34 extracts elements in turn from upstream to downstream of the hierarchical structure of the structure Sc extracted from the new structured document data to be stored, and assigns element IDs to these elements (steps S21 to S26). After that, the document storing unit 34 updates index data (step S27), and stores that structured document data in the structured document data storage unit 113 (step S28). Note that the element ID of a root element of each structured document to be stored is "0".

It is important to take an approach that if an element in the structure SC is an indispensable element (that is, a fixed allocation element) in that structure based on its TID, a predetermined ElemID is assigned to that fixed allocation element; otherwise, an element ID is assigned to an element in turn from the maximum offset ElemID of the fixed allocation element.

In step S21, the root element of Sc is extracted, and let E be this element. If the element ID (OidOffset) of the fixed allocation element is registered for the TID of the element E in the statistical data table of Sp, that element E is the fixed allocation element. In this case (step S22), the flow advances to step S23, and the element ID corresponding to that fixed allocation element registered in the statistical data table is assigned to the element E. If the element E is not the fixed allocation element (step S22), the flow advances to step S24 to assign, to the element E, an element ID which is other than the element ID determined in advance for the fixed allocation element and is unique in the new structured document data to be stored.

After the processes in steps S22 to S24 are done for all the elements of Sc and element IDs are assigned to all the elements of Sc (steps S25 and S26), the OIDs <DocID, ElemID, TID> have been assigned to all the elements of Sc.

The flow advances to step S27 to update index data on the basis of text elements of Sc. More specifically, a lexical item (a character string such as a word, a sentence including a plurality of words, and the like) is extracted from text data of a text element, and if the extracted lexical item is not stored in the lexical table shown in FIG. 8, that lexical item is added to the lexical table. The OID of that text element is stored to be linked with the lexical item in the lexical table, which is included in the text data of the text element.

In step S28, the document storing unit 34 acquires an object corresponding to the OIDp given as the storage destination by scanning the structured document data storage unit 113, and adds the OIDs of respective elements of the structured document data to be stored to an OID sequence indicating a set of objects of child elements of that object data. More specifically, the structured document data to be stored in which the aforementioned OIDs are assigned to the respective elements is stored in the structured document storage unit 113 to be added immediately under the "bookFolder" 302 with the OIDp <1, 0, F1>.

The storing processing operation will be described in detail below.

Figure 17:
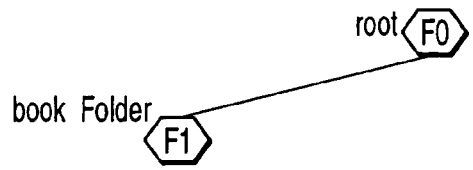
FIG. 17 shows an example of an initial state of a structure stored in the structure template storage unit.

A case will be examined below wherein the structure template storage unit 112 stores a hierarchical structure including two elements, i.e., a "root" folder and "bookFolder" folder, as shown in FIG. 17, and the structured document data shown in FIG. 1 is to be inserted and stored under the "bookFolder" folder. Note that the TID "F0" is assigned to the "root" folder, and the TID "F1" is assigned to the "bookFolder" folder.

Figure 12:
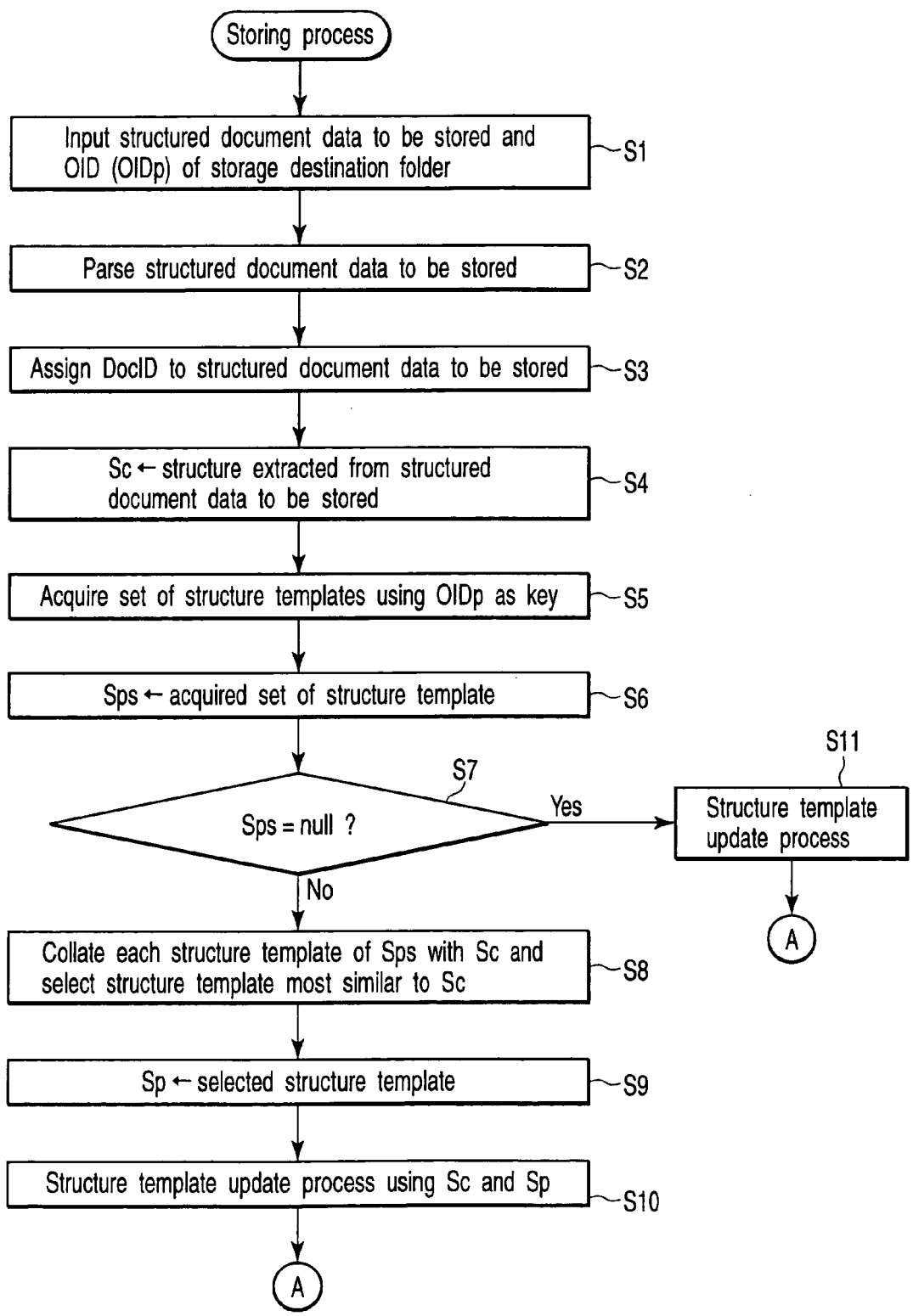
FIG. 12 is a flowchart for explaining a storage processing operation.

In this case, the flow advances from step S7 to step S11 in FIG. 12. In step S11, the structure Sc extracted from the structured document data in FIG. 1 is determined as the initial structure template ST1 via the processes in steps S31 to S34 in FIG. 14.

That is, as shown in FIG. 9, a "book" element under the "bookFolder" folder stores the initial structure template ST11 shown in FIG. 10 and the statistical data table shown in FIG. 11.

The structure template ST1 shown in FIG. 10 is expressed by a tree-like graph formed by extracting only the structure of the structured document data in FIG. 1. The TIDs "D2", "E3", and "T4" are respectively assigned to structure elements corresponding to "book", "title", and "title/#text". Note that the structured document data shown in FIG. 1 includes two "author" elements to have a sibling relationship, but they are contracted to one element. That is, the TIDs "E6", "E7", and "E9" are respectively assigned to "author", "first", and "last" elements.

In step S36 in FIG. 14, "1" is added to the value of NumRegist in the statistical data table of the structure template ST1 to update it to "1".

In the structured document data in FIG. 1, "book" occurs once. Hence, in step S36 in FIG. 14, "1" is added to the value of SumOcc to update it to "1", "1*1=1" is added to the value of SumOcc2 to update it to "1", the value of MinOcc is updated to "1", and the value of MaxOcc is updated to "1" in association with the TID "D2" corresponding to that element of the statistical data table. That is, SumOcc=1, SumOcc2=1*1=1, MinOcc=1, MaxOcc=1, and NumRegist=1.

In the structured document data in FIG. 1, "author" occurs twice. Hence, in step S36 in FIG. 14, "2" is added to the value of SumOcc to update it to "2", "2*2=4" is added to the value of SumOcc2 to update it to "4", the value of MinOcc is updated to "2", and the value of MaxOcc is updated to "2" in association with the TID "E6" corresponding to that element of the statistical data table. That is, SumOcc=2, SumOcc2=2*2=4, MinOcc=2, MaxOcc=2, and NumRegist=1.

A case will be examined below wherein structured document data shown in FIG. 18 is to be stored in the "bookFolder" folder. Upon storing the structured document data shown in FIG. 18, since the template shown in FIG. 10 is selected as Sp in step S8 in FIG. 12, the flow immediately advances from step S31 to step S35 and further to step S36 in FIG. 14 in step S10.

In step S36 in FIG. 14, "1" is added to the value of NumRegist of the statistical data table of the structure template ST1 to update it to "2", as shown in FIG. 19.

In the structured document data in FIG. 18, "book" occurs once. Hence, in step S36 in FIG. 14, "1" is added to the value of SumOcc to update it to "1", and "1*1=1" is added to the value of SumOcc2 to update it to "2" in association with the TID "D2" corresponding to that element of the statistical data table, as shown in FIG. 19. The values of MinOcc and MaxOcc are left unchanged from "1". That is, SumOcc=1+SumOcc=2, SumOcc2=1*1+SumOcc2=2, MinOcc=Min(1, MinOcc)=1, MaxOcc=Max(1, MaxOcc)=1, and NumRegist=1+NumRegist=2.

In the structured document data in FIG. 18, "author" occurs once. Hence, in step S36 in FIG. 14, "1" is added to the value of SumOcc to update it to "3", "1*1=1" is added to the value of SumOcc2 to update it to "5", and the value of MinOcc is updated to "1" in association with the TID "E6" corresponding to that element of the statistical data table, as shown in FIG. 19. The value of MaxOcc is left unchanged from "2". That is, SumOcc=1+SumOcc=3, SumOcc2=1*1+SumOcc2=5, MinOcc=Min(1, MinOcc)=1, MaxOcc=Max(1, MaxOcc)=2, and NumRegist=1+NumRegist=2.

A case will be examined below wherein structured document data shown in FIG. 20 is to be stored in the "bookFolder" folder. Upon storing the structured document data shown in FIG. 20, since the template shown in FIG. 10 is selected as Sp in step S8 in FIG. 12, the flow immediately advances from step S31 to step S35 and further to step S36 in FIG. 14 in step S10. In the structured document data in FIG. 20, "author" occurs twice. FIG. 21 shows the update result of the statistical data table of the structure template ST1 in step S36.

Figure 22:
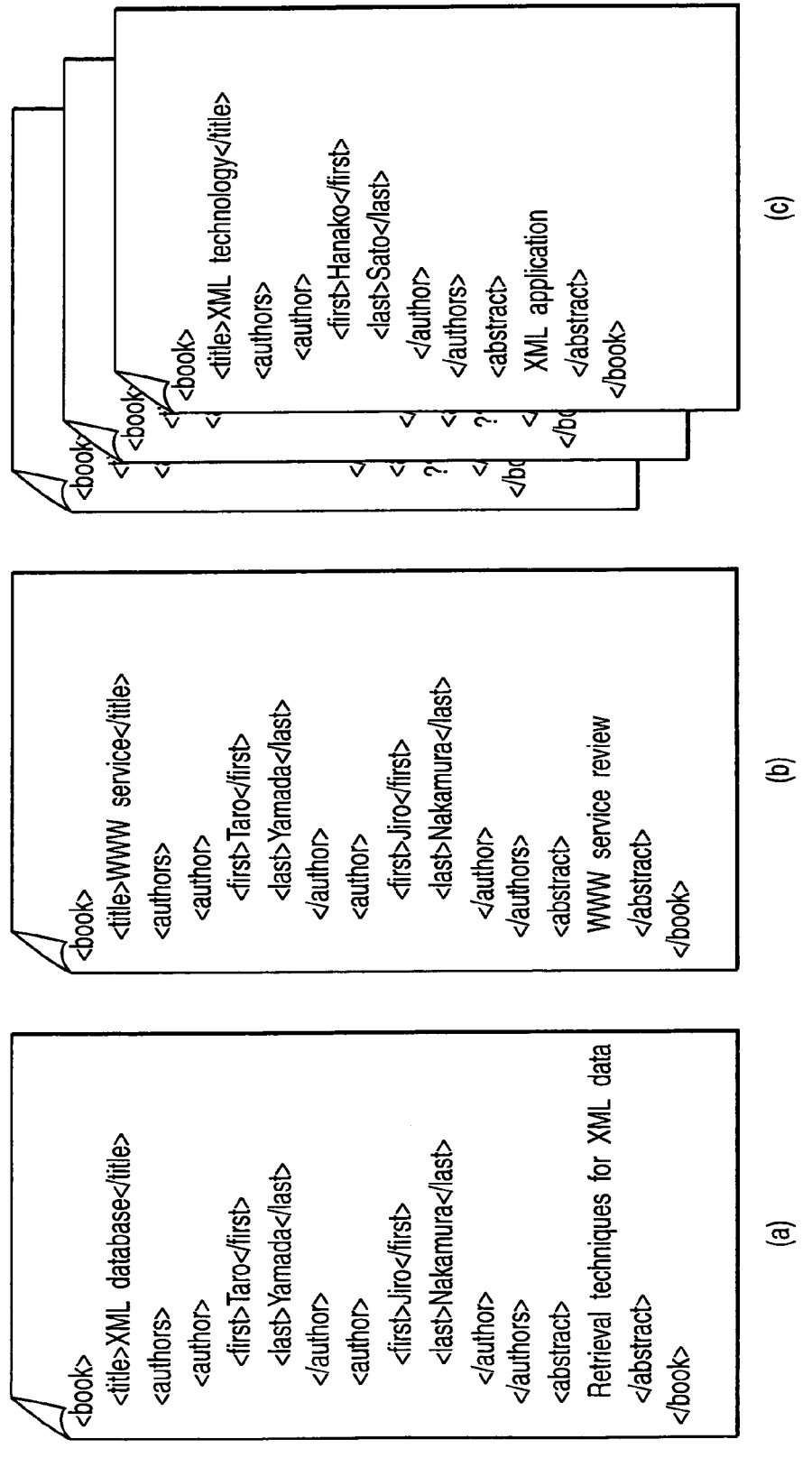
FIG. 22 shows structured document data to be stored in the "bookFolder" folder.
Figures 23, 24:
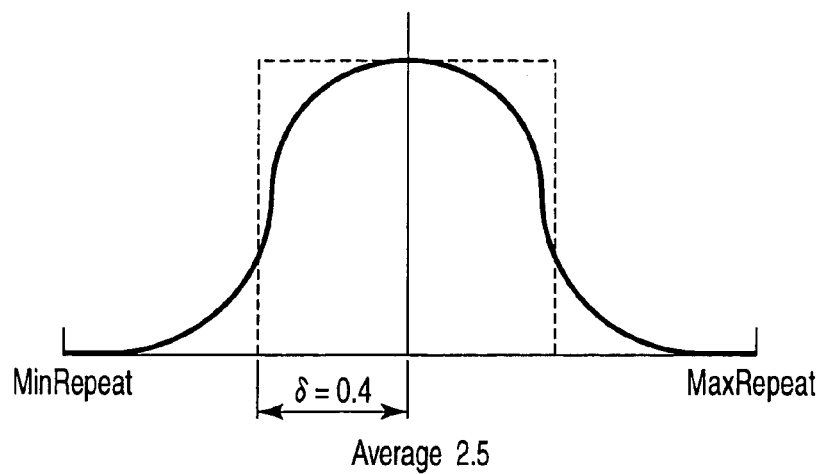
FIG. 23 shows the state of the statistical data table of the structure template ST1 upon storing a large number of structured document data.
FIG. 24 is a graph for explaining the average value and standard deviation of the frequencies of occurrence of "author" elements in a plurality of stored structured document data.

Furthermore, a case will be examined below wherein a large number of structured document data shown in (a), (b), and (c) of FIG. 22 are to be stored in the "bookFolder" folder. Upon storing such large number of structured document data, since the template shown in FIG. 10 is selected as Sp in step S8 in FIG. 12, the flow immediately advances from step S31 to step S35 and further to step S36 in FIG. 14 in step S10. FIG. 23 shows the update result of the statistical data table of the structure template ST1 after a large number (e.g., a total of 100) of structures document data are stored.

The statistical data table in FIG. 23 reveals the followings. (1) Elements whose TIDs are "D2", "E3", "T4", "E5", and the like certainly occur once. (2) In each of the 100 structured document data, "author" with the TID "E6" appears (occurs) once (minimum) or three times (maximum). Its average is "2.5", and the standard deviation is "0.4". That is, "author" occurs twice or more in most of the 100 structured document data. (3) In each of the 100 structured document data, "abstract" with the TID "E11" and "abstract/#text" with the TID "T12" appear zero time or once.

FIG. 24 is a graph for explaining an image of the histogram of occurrence of "author" with the TID "E6". The average frequency of occurrence is "2.5", and the standard deviation is "0.4". It is supposed that 68% of the 100 structured document data concentrate within the range from "2.5−0.4" to "2.5+0.4" to have "2.5" as the center.

By storing a large number of structured document data in this way, a structure common to a group of some structured document data of a large number of structured document data appears on the statistical data table of the structure template ST1. By extracting this common structure, a new structure template can be generated. A new structure template ST2 extracted from the structure template ST1 is stored under "bookFolder" in the structure template storage unit 112 in the same manner as the structure template ST1.

The structure template extraction processing operation by the structure template update unit 36 will be explained below with reference to the flowcharts shown in FIGS. 15 and 16. Note that this structure template extraction process starts at given time intervals or as needed.

The structure template update unit 36 checks if data on the statistical data table of each structure template Sq stored in the structure template storage unit 112 meets generation criteria of a new structure template (step S51).

As the generation criteria of a new structure template, "NumRegist>$\alpha$ and (the number of elements that satisfies SumOcc>$\gamma$)>$\beta$" ($\alpha$, $\beta$, and $\gamma$ are threshold values). If a structure template Sq1 having a statistical data table that meets such generation criterion is found (step S52), the flow advances to step S52; otherwise, the process ends.

In step S53 and subsequent steps, a new structure template Sq2 is generated based on the structure template Sq1. That is, when a typical structure pattern appears on the structure template in the statistical data table, that typical structure pattern is stored as the new structure template Sq2.

In step S53, the average value of the number of occurrences per structure document data, the standard deviation, and the average number of repetitions (NumSib) are calculated for each element of Sq1 on the basis of the statistical data table of the structure template Sq1 (step S53). The average and standard deviation are calculated by:

Average=Sum$Occ$/NumRegist

Standard deviation=$\{$Sum$Occ$2/NumRegist−(Sum$Occ$/NumRegist)$^2\}^{1/2}$

Num$Sib$=$INT$(average−standard deviation)

The standard deviation means an error. Assuming that the variation of whole data to be analyzed complies with a symmetrical bell-shaped normal distribution, this means that about 68% of data are present within the range from "average−standard deviation" to "average+standard deviation". It is expected that the probability of the number of repetitions of the structure$\geq$NumSib is 84% or higher.

The flow advances to step S54. If an element of NumSib$\neq$0 of those on the statistical data table is found, the new structure template Sq2 to which such element (element of NumSib$\neq$0) is added to Sq1 in correspondence with the value of NumSib is generated. The structure template Sq2 and its statistical data table are stored as one set in the folder which has already been stored in the structure template storage unit 112 and stores the structure template Sq1.

Figure 16:
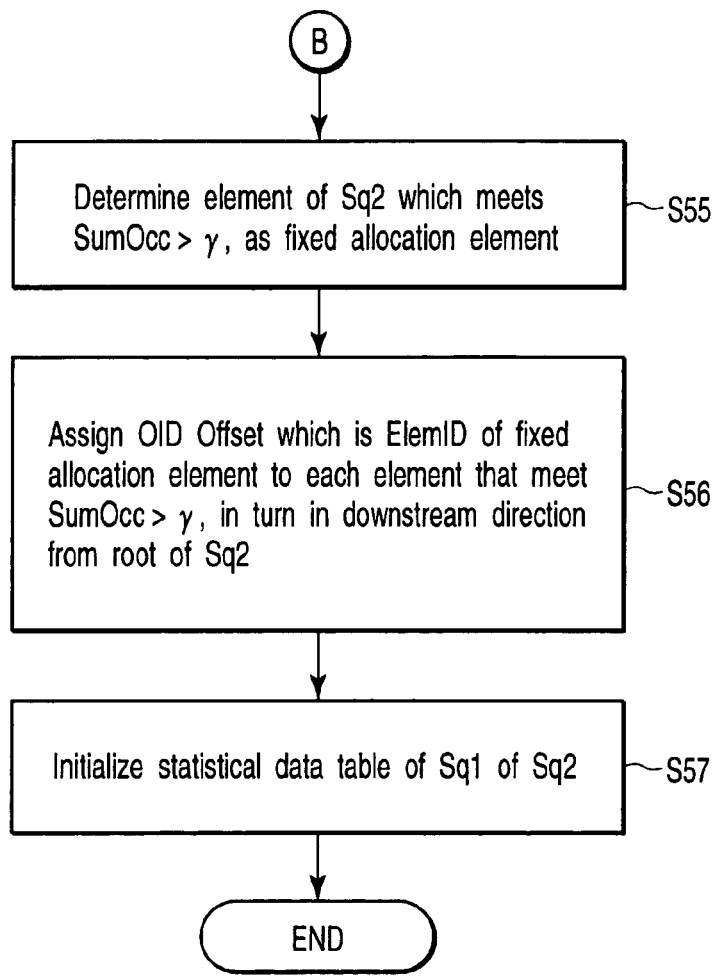
FIG. 16 is a flowchart for explaining a structure template extraction processing operation.

The flow advances to step S55 in FIG. 16, and the following processes are executed while tracing (traversing) structure elements to lower nodes in depth priority to have a root node of the structure template Sq2 as a start node, and registering the TIDs of respective elements in the statistical data table of the structure template Sq2.

Of the structure elements of Sq2, elements that meet SumOcc>$\gamma$ determined as fixed allocation elements (step S55). Element IDs (OidOffset) of fixed allocation elements are assigned to the fixed allocation elements in turn from "0", and are registered in the statistical data table (step S56). On the other hand, of the structure elements of Sq2, elements that meet SumOcc$\leq$$\gamma$ are not fixed allocation elements, and the OidOffset is not assigned. In this case, a value "UNDEF" (undefined) is registered in "OidOffset" in the column corresponding to the TIDs of such elements on the statistical data table.

Upon completion of search for all the elements of Sq2, the values of SumOcc, SumOcc2, MinOcc, MaxOcc, NumSib, average, and standard deviation on the statistical data table of Sq1 and Sq2 are initialized (step S57).

Figure 15:
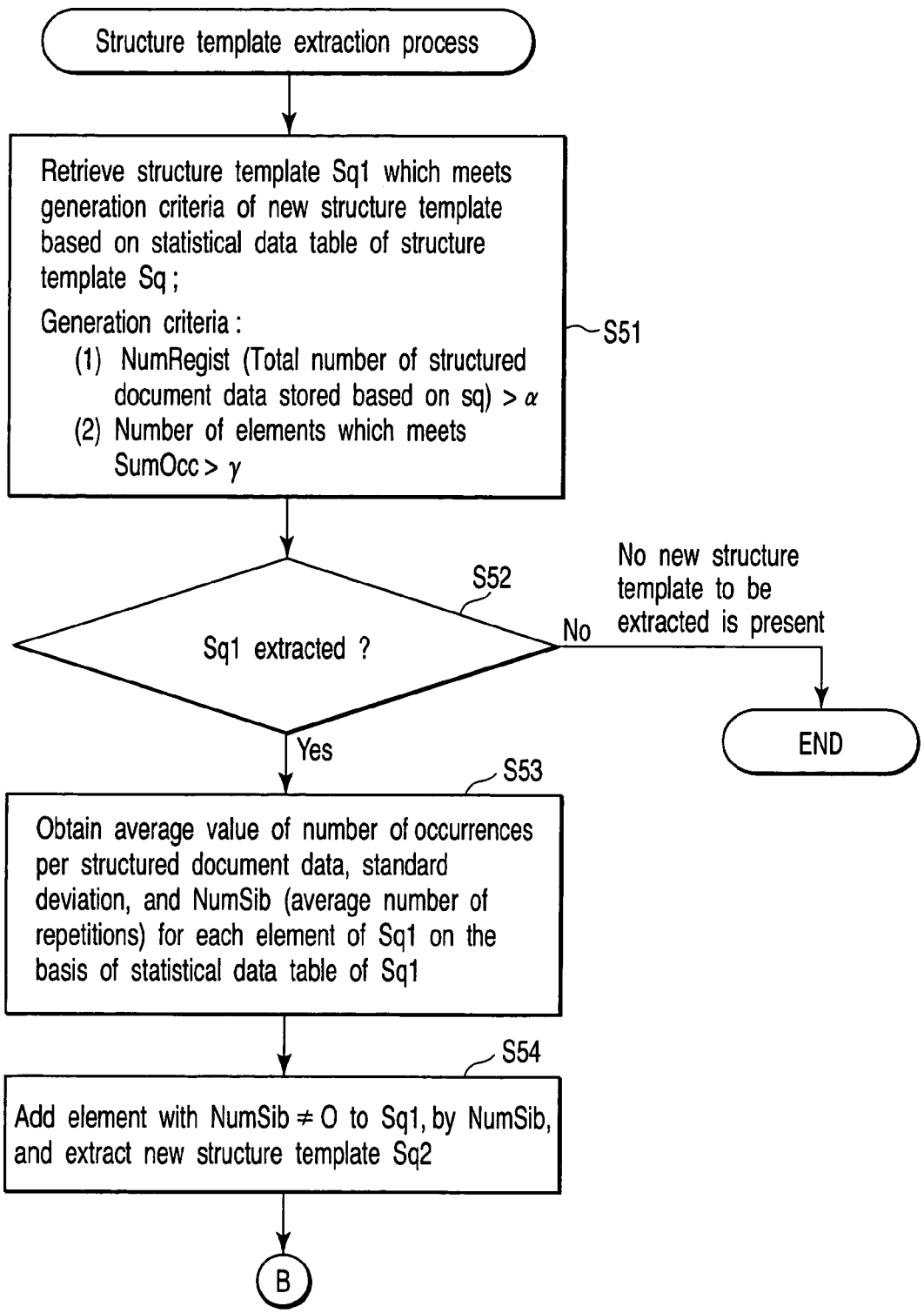
FIG. 15 is a flowchart for explaining a structure template extraction processing operation.
Figure 25:
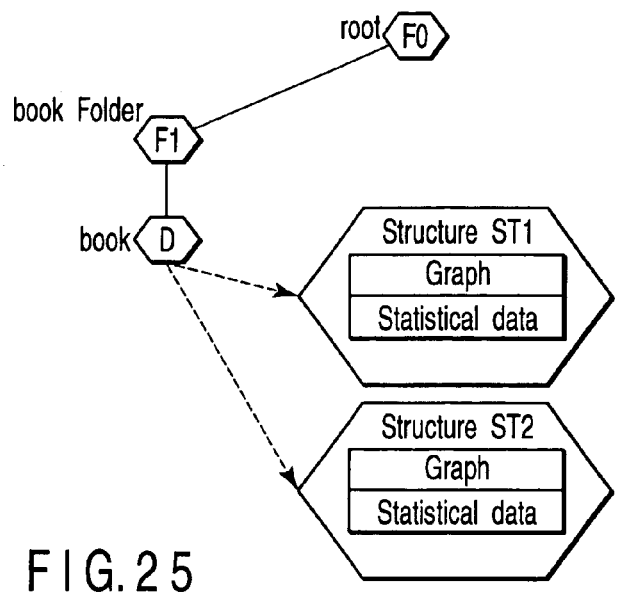
FIG. 25 illustrates a structure which is stored in the structure template storage unit when a structure template ST2 is generated from the structure template ST1.
Figure 26:
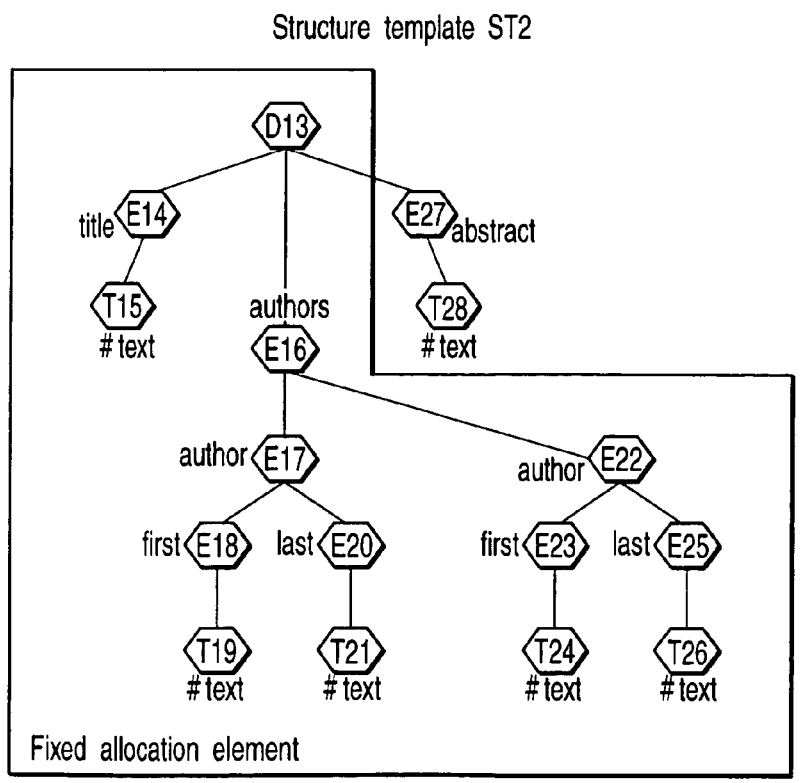
FIG. 26 shows the structure template ST2.

For example, from the statistical data table of the structure template ST1 (see FIG. 10), as shown in FIG. 23, the new structure template is generated, as shown in FIG. 26, by the structure template extraction process in FIGS. 15 and 16. Assume that α=100, β=5, and γ=100. The newly generated structure template ST2 and statistical data table are stored in the "bookFolder" folder, as shown in FIG. 25.

In the statistical data table of FIG. 23, since the average value of the TID "E6" is "2.5", and "author" occurs twice or more per structured document data, a structure part contracted to one "author" in the structure template ST1 in FIG. 10 is expanded to two elements in the structure ST2 in FIG. 26.

New TIDs which are different from those of the structure template ST1 are re-assigned to elements of the structure template ST2.

FIG. 27 shows the initialized statistical data table of the structure template ST2, and FIG. 28 shows that of the structure template ST1. Respective elements of the structure template ST2, which correspond to those (TIDs thereof) of the structure template ST1 that meet SumOcc≧γ (=100) on the statistical data table in FIG. 23, are set as fixed allocation elements, and element IDs "0" to "13" are assigned in turn from upstream elements, as shown in FIG. 27. Note that "abstract" with the TID "E27" and "abstract/#text" with the TID "T27" are not set as fixed allocation elements. The values of SumOcc, SumOcc2, MinOcc, MaxOcc, NumSib, average, and standard deviation on the statistical data tables shown in FIGS. 27 and 28 are initialized to "0" in step S57 in FIG. 16.

Figures 29, 30:
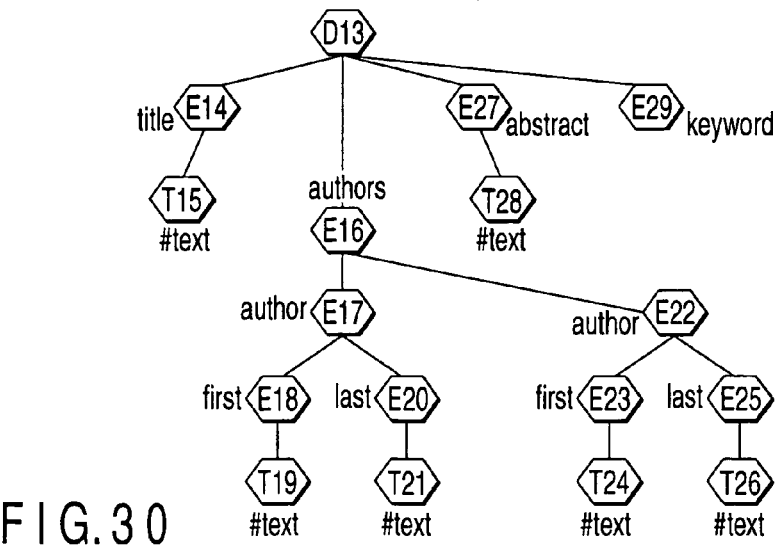
FIG. 29 shows the statistical data table of the structure template ST2 after a large number of structured document data are stored.
FIG. 30 shows the updated structure template ST2.

FIG. 29 shows the statistical data table of the structure template ST2 when a large number of structured document data <book><title> . . . </book> are stored in the "bookFolder" folder based on the structure template ST2 after the structure template ST2 is generated. FIG. 30 shows the structure template ST2.

New TIDs different from those of the structure template ST2 are assigned to respective elements of the structure template ST2 in FIG. 30.

To the structure template ST2 shown in FIG. 30, "keyword" with the TID "E29" is added. As can be seen from FIG. 29, the average frequencies of occurrence per structured document data of "abstract" with the TID "E27" and "abstract/#text" with the TID "T27" are "1".

Figure 31:
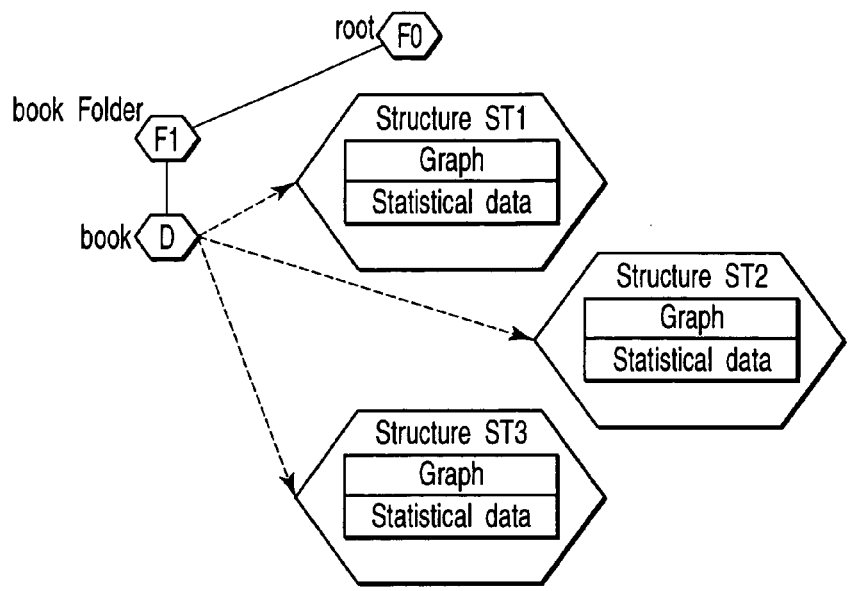
FIG. 31 illustrates a structure which is stored in the structure template storage unit when a structure template ST3 is generated from the structure template ST2.
Figure 32:
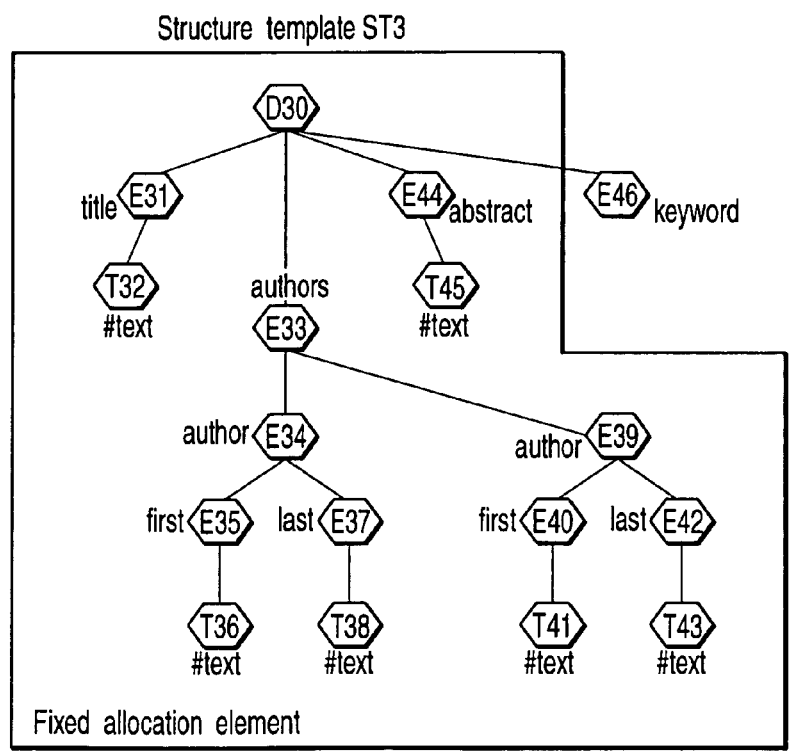
FIG. 32 shows the structure template ST3.

Since data on the statistical data table shown in FIG. 29 meet the generation criteria of a new structure template, a new structure template ST3 is generated, as shown in FIG. 32. The structure template and its statistical data table shown in FIG. 33 are stored in the "bookFolder" folder, as shown in FIG. 31.

As can be seen from FIG. 29, since "abstract" with the TID "E27" and "abstract/#text" with the TID "T27" certainly appear once per structured document data, they are newly set as fixed allocation elements (new TIDs are "E44" and "T45"), as shown in FIG. 33, in the structure template ST3, and OidOffsets "14" and "15" are set.

In this manner, a new structure is recognized from one structure template ST1, and a new structure template ST2 is generated (extracted). Another new structure is recognized from the structure template ST2, and a structure template ST3 is generated (extracted). If one structure template represents the type of structured document data, structured document data can be stored in the structured document data storage unit 113 while being classified in one of types of structures by selecting structure template in step S8 in FIG. 12.

Note that the OID of each element of the structured document data to be stored includes the document ID (DocID), element ID (ElemID), and template ID (TID). Therefore, the TID of the structure template selected in step S8 in FIG. 12 upon storage is included in the OID of each element of the structured document data.

Figure 34:
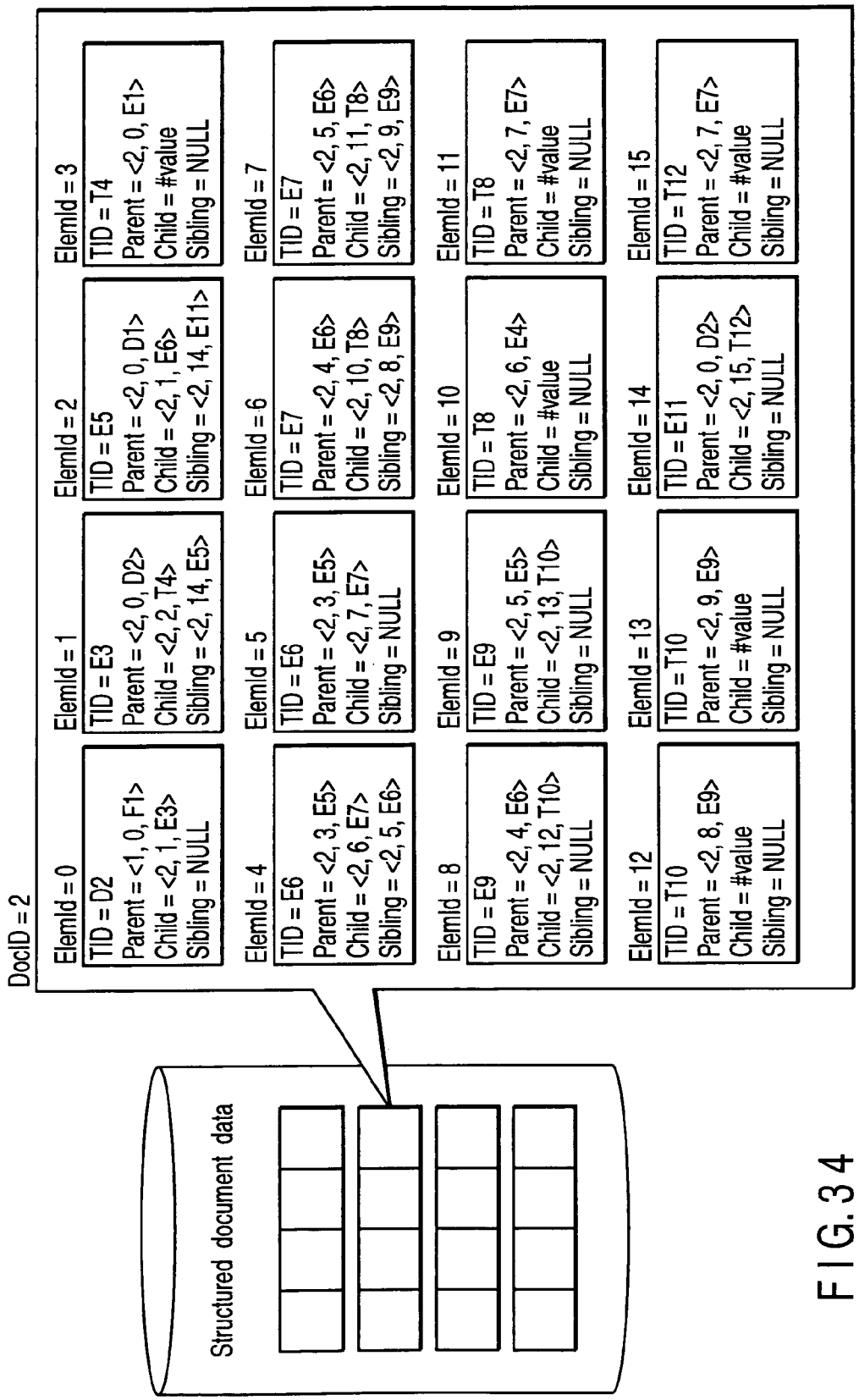
FIG. 34 illustrates a storage example of a structured document data storage unit when respective elements of the structured document data shown in FIG. 1 are stored while being assigned with the TIDs of the structure template ST1.

FIG. 34 illustrates a storage example of the structured document data storage unit 113 when respective elements of the structured document data shown in FIG. 1 are stored while being assigned with the TIDs of the structure template ST1. Note that the document ID (DocID) of the structured document data in FIG. 1 is "2". Upon storing the structured document data with the DocID "2", since fixed allocation elements are not set yet, element IDs are assigned in turn from upstream to downstream from the element ID "0" of the root node of the structured document data.

As shown in FIG. 34, the structured document data storage unit 113 includes a plurality of storage areas (memory location) for storing respective structured documents (files thereof). Focusing attention on one storage area, e.g., a storage area of structured document data with the DocID "2", that storage area includes a plurality of storage areas for storing respective elements in that structured document data. The storage area of each structured document data can be uniquely specified by the document ID. That is, the document ID is information corresponding to an address that specifies the storage area of each structured document in the structured document data storage unit 113. A storage area of each element in the storage area of each structured document data can be uniquely specified by the element ID. That is, the element ID is information corresponding to an address that specifies the storage area of each element.

Therefore, when an OID is given, the allocation of the storage area of an element of interest in the structured document data storage unit 113 can be specified on the basis of the document ID and element ID in the OID.

The storage area of each element stores the TID of that element, the OID of a parent element of that element, the OID of a child element or text data of that element, the OID of a sibling element of that element, and the like.

The fixed allocation element is an element whose location of occurrence of that element on the structure of all the structured document data in which that element occurs is always constant, i.e., an element which forms a typical structure (structure template) common to many structured document data stored in the structured document data storage unit 113. A predetermined area in the storage area of each structured document is set as the storage area of the fixed allocation element. The element ID (OidOffset) of the fixed allocation element is assigned to the storage area of the fixed allocation element. By specifying such area by the element ID (OidOffset) of the fixed allocation element, the allocation of an element having the OidOffset as the element ID in the typical structure can be specified from that element ID. That is, the element IDs of elements allocated upstream a given element can be easily obtained based on its OidOffset.

After many structured document data are stored, many fixed allocation elements can be set accordingly. After many structured document data are stored, many structure templates can be generated based on their structure differences. Note that the fixed allocation element can be discriminated by the identical OidOffset independently of structure templates that include the fixed allocation element.

Respective elements of structured document data are classified depending on the structures of the structured document data and are assigned TIDs. Furthermore, when an element of interest is a fixed allocation element, the element ID of OidOffset is assigned. Hence, when an OID is given, not only structured document data having that element can be specified based on the document ID included in the OID, but also the allocation of that structured document data on the structure can be specified based on the TID included in that OID. Furthermore, the allocation of the element in the structured document data and the storage area in the structured document data storage unit 113 can also be specified based on the ElemID (especially, OidOffset) included in the OID.

In this manner, the OID of each element of structured document data is made up of the document ID (DocID), element ID (ElemID), and template ID (TID), and the locations of storage areas of fixed allocation elements commonly set to all structure templates in the storage areas that store respective structured document data in the structured document data storage unit 113 are fixed, and the storage areas of the fixed allocation elements are given as the element IDs. Hence, upon retrieving structured document data, if the OID of an element that meets one retrieval condition is obtained, the OIDs of upstream elements of that element can be obtained by converting or rewriting the OID value without tracing the hierarchical structure.

When the structure template ST1 in FIG. 10 and the structure template ST2 in FIG. 26 are stored in (the "bookFolder" folder of) the structure template storage unit 112, and when new structure document data in which an "author" element repetitively appears twice in an "authors" element shown in FIG. 1 is to be stored, the structure template ST2 in which an "author" element repetitively appears twice in an "authors" element is selected as a structure template which is most similar to the structure Sc of that structured document data in step S8 in FIG. 12.

Figure 35:
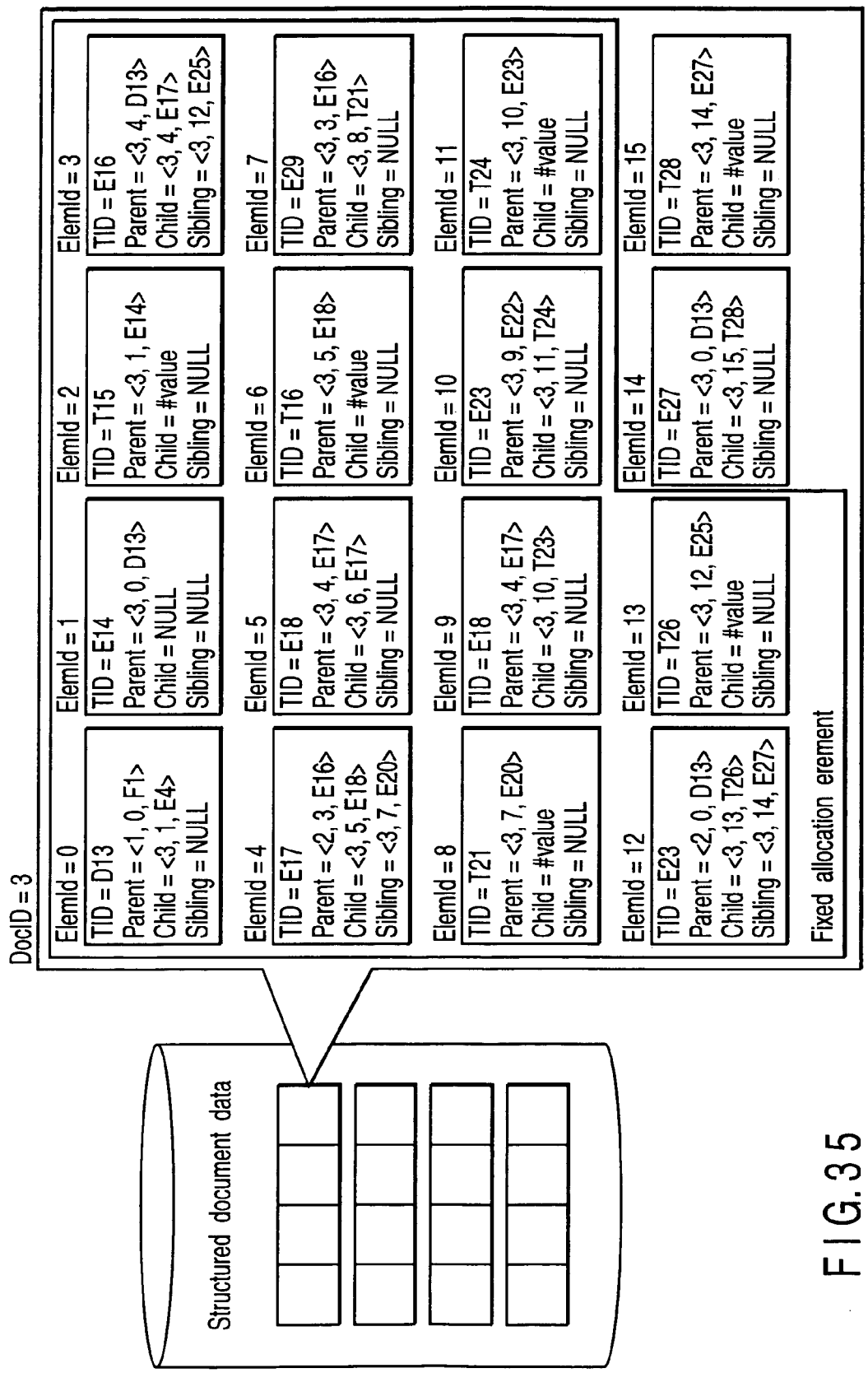
FIG. 35 illustrates a storage example of the structured document data storage unit when the structure template ST2 is selected upon storing the structured document data in FIG. 1, and elements of the structured document data are stored while being assigned with the TIDs of the structure template ST2.

FIG. 35 illustrates a storage example of the structured document data storage unit 113 when the structure template ST2 is selected upon storing the structured document data in FIG. 1, and elements of the structured document data are stored while being assigned with the TIDs of the structure template ST2. Note that the document ID (DocID) of the structured document data in FIG. 1 is "3". In the structure template ST2, elements IDs "1" to "13" are set as those of fixed allocation elements.

That is, the positions of occurrence of a "book" element at the root of the structured document data, "title" and "authors" elements that occur under the "book" element, a text element ("title/#text") (of the "title" element) that occurs under the "title" element", two "author" elements that occur under the "authors" element, and "first" and "last" elements and their text elements that occur under the respective "author" elements are settled. Also, the positions of storage areas for storing these fixed allocation elements are fixed in the storage areas for storing respective structured document data in the structured document data storage unit 113. The areas of the fixed allocation elements are specified by the element IDs corresponding to these storage areas.

Respective elements of the structured document data in FIG. 1 are assigned the OIDs having the document ID "3" and the TIDs of structure elements of the structure template ST2. The fixed allocation elements are assigned fixed element IDs (OidOffset), and elements which are not the fixed allocation elements are assigned element IDs other than OidOffset. For example, the OID of the "book" element is <DocID=3, ElemID=0, TID=D13>. The OID of the first "author[1]" element is <DocID=3, ElemID=4, TID=E17>. The OID of the second "author[2]" element is <DocID=3, ElemID=9, TID=E22>. Note that "abstract" and "abstract/#text" elements which are not fixed allocation elements are assigned "14" and "15" as element IDs other than the element IDs "1" to "13" of the fixed allocation elements.

(Retrieval)

Figure 36:
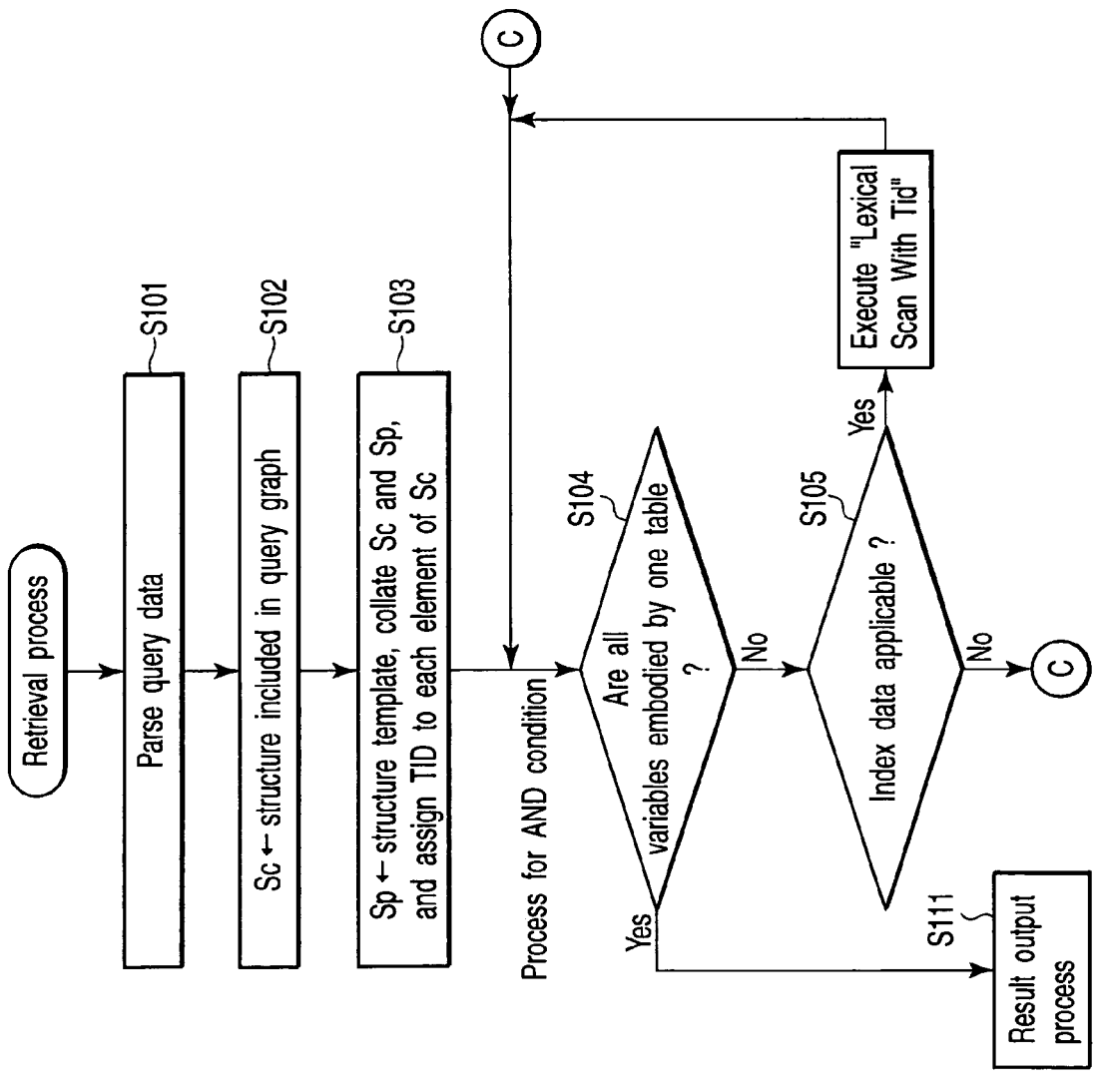
FIG. 36 is a flowchart for explaining a retrieval processing operation.

The processing operation of the retrieval processing unit 104 will be described below with reference to the flowcharts of FIGS. 36 and 37.

FIG. 38 shows an example of query data to be input to the retrieval processing unit 104. XML follows a query description method based on a query language XQuery (XML Query Language).

The query data shown in FIG. 38 describes the condition: "A hierarchical tree of a structured document DB "DB" includes an "authors" element. This "authors" element includes a "last" element having a text element including a character string "Tanaka". Retrieve a list of such "authors"."

The query data shown in FIG. 38 is transmitted from the retrieval unit 203 of the client 201 to the server 101, and is received by the request processing unit 102 of the server 101.

An overview of the processing operation of the retrieval processing unit 104 which has received the query data shown in, e.g., FIG. 38 will be described below with reference to the flowcharts shown in FIGS. 36 and 37. The structure template storage unit 112 has the state shown in FIG. 25, i.e., the structure templates ST1 and ST2 are stored in the "bookFolder" folder.

The query data received by the request processing unit 102 is passed to the query parsing unit 41 of the retrieval processing unit 104. The query parsing unit 41 parses the received query data (step S101). The query structure extraction unit 42 extracts a graph structure called a query graph from the query data on the basis of the parsing result of the unit 41 (step 102). For example, in case of the query data shown in FIG. 38, a query graph shown in FIG. 39 is obtained. Let Sc be the structure (query graph) in the query data.

The query graph is formed by connecting variables corresponding to element names (e.g., "db "DB"", "authors", "last") and a lexical item (character string) such as "Tanaka" included in the query data to respective variables in accordance with the inclusive relationship of the elements and character strings included in the query data, as shown in FIG. 39.

The query structure collation unit 43 extracts a structure from the structure template storage unit 112 of the structured document DB 111. Let Sp be the extracted structure. In this case, the structure below the most upstream element of the hierarchical tree of the structured document database, i.e., the "book" element, which is designated in the query data, is extracted. The extracted structure Sp is collated with above Sc. As a result, the TIDs that can be assumed are assigned to respective elements of Sc (step S103).

FIG. 40 shows three combinations of TIDs obtained for variables V0 to V2 in FIG. 39 as a result of collation between Sc and Sp. The first combination is obtained from the structure template ST1, and the TIDs "F0", "F10", and "E5" are obtained in the order of variables V0, V1, and V2. The second combination is obtained from the structure template ST2, and the TIDs "F0", "T21", and "E16" are obtained in the order of variables V0, V1, and V2. The third combination is obtained from the structure template ST2, and the TIDs "F0", "T26", and "E16" are obtained in the order of variables V0, V1, and V2.

The query execution unit 44 generates in turn data which represent combinations of assumable values of variables sets called tables for the purpose of embodying all variables included in the query graph. Note that a unit process that generates one table is called an operator.

The query execution unit 44 checks if all variables included in the query graph are embodied by one table (step S104). If Yes in step S104, since a combination of values that all variables can assume is embodied, that combination is output as a result. Note that the value, that each variable can assume is the OID.

If not all variables included in the query graph are embodied by one table, steps S105 to S110 are repeated until they are embodied.

It is checked in step S105 if a retrieval process using index data stored in the index data storage unit 114 can be made. If a function of a lexical index system such as "contains" or the like is available, a high-speed retrieval process can be attained using index data (FIG. 8) in the structured document DB 111. In this case, a LexicalScanWithTid operator is executed.

Figure 37:
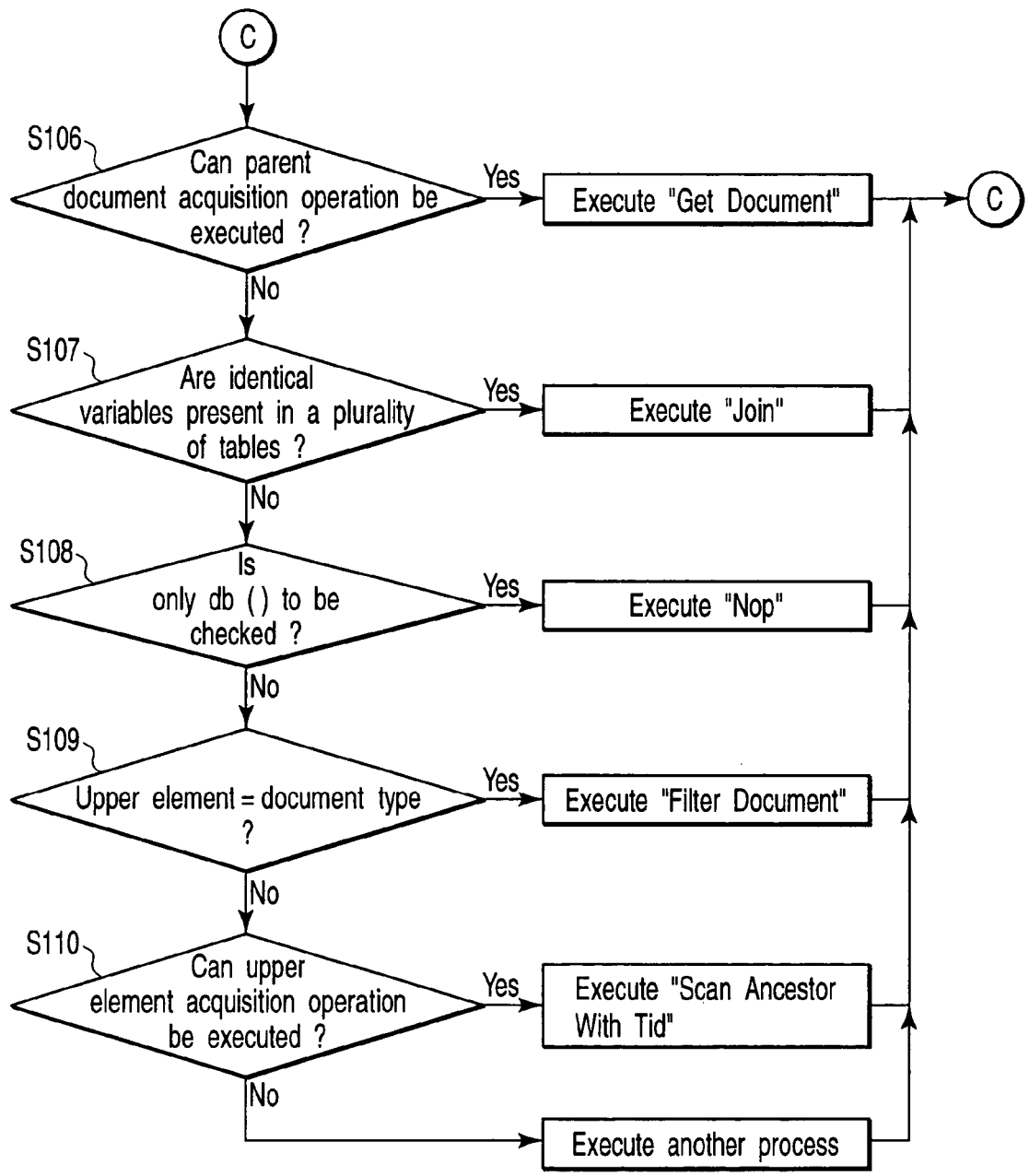
FIG. 37 is a flowchart for explaining a retrieval processing operation.
Figures 3, 4:
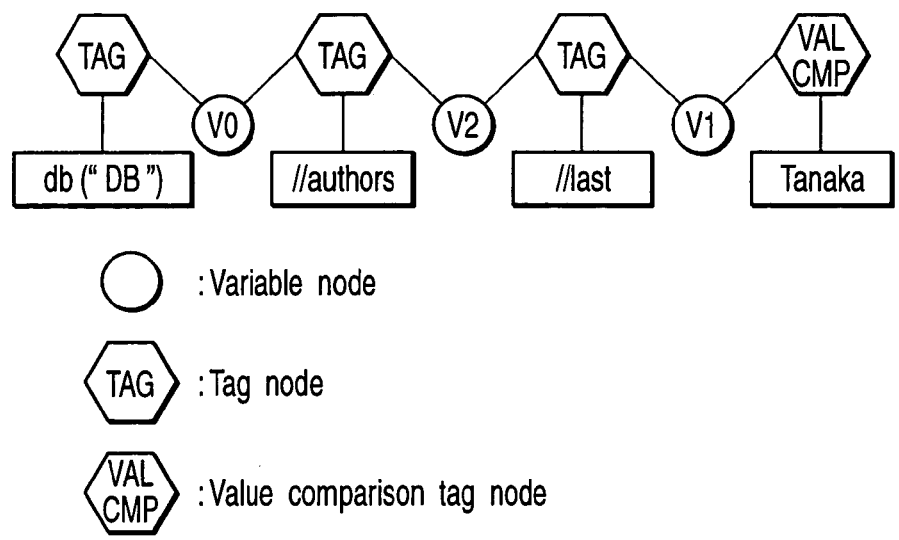

It is checked in step S106 in FIG. 37 if a parent document acquisition operation can be made. If the parent document root OID can be directly extracted from the child element OID, a GetDocument operator is executed.

It is checked in step S107 if identical variables are present in a plurality of tables. In such case, a Join operator is executed for two tables each.

If it is determined in step S108 that all variables, the values of which are to be acquired, are embodied, and only "db( )" which is located at the head of the query data and designates the root of the database remains, an Nop operator (no operation) is executed.

If it is determined in step S109 that the document type TID is assigned to a variable as an upper layer of arbitrary two variables, and the values of these two variables are embodied, a FilterDocument operator is executed.

If it is determined in step S110 that a variable is present in an upper layer of variables, the variables in a lower layer are embodied, and the variable in the upper layer is not embodied, a ScanAncestorWithTid operator is executed.

In step S111, a result output process is done. In this case, combinations of values (OIDs) that respective variables can assume (a combination of OIDs) are obtained as a table. Each combination includes a plurality of OIDs having an identical document ID and, hence, the combination on the table corresponds to one structured data. By extracting structured data corresponding to respective document IDs obtained from the combinations on the table, a set of structured document data which match the query data can be obtained.

In the query graph shown in FIG. 39, variables are expressed by nodes surrounded by circles, and variable names are described in these circles. Such nodes are called variable nodes. Also, elements designated in the query data are expressed by nodes surrounded by hexagons written with "TAG". Such nodes are called tag nodes. Furthermore, character strings designated in the query data are expressed by nodes surrounded by hexagons written with "VALCMP". Such nodes are called value comparison nodes.

Based on the TIDs assigned to respective variables of the query graph shown in FIG. 39, the processes in steps S104 to S110 are executed as follows. The following explanation will be given with reference to FIGS. 41 and 42.

(1) Since the query graph includes a value comparison tag node which corresponds to a contains lexical index system function, a LexicalScanWithTid operator is executed for a character string "Tanaka" (FIG. 41(a)). That is, the OIDs of elements including the character string "Tanaka" are obtained from index data stored in the index data storage unit 114, and elements each having one of the TIDs "T10", "T21", and "T26" are obtained. As a result, a variable node V1 is embodied (Table 1 shown in FIG. 42(a)).

(2) Since the variable V1 is embodied, but the variable V2 in an upper layer of the variable V1 is not embodied, a ScanAncestorWithTid operator is executed for the respective OIDs of Table 1 in FIG. 42(a) (FIG. 41(b)).

For example, a case will be explained below wherein a ScanAncestorWithTid operator is executed for the first OID<2, 13, T10> of Table 1 in FIG. 42(a) to obtain the OID which is upstream that first OID and has the TID "E5" corresponding to the variable V2. That is, in this case, when the statistical data table of the structure template including the TID "E5" is looked up, since that structure template does not include any fixed allocation elements, respective elements of the structured document data with the document ID "2" must be traced by accessing the structured document storage unit 113. For this reason, disk I/O occurs. By tracing upstream nodes from the element with the OID <2, 13, T10> of the structured document data with the document ID "2", an element ID (e.g., element ID "2" corresponding to "authors" in this case) of an element with the TID "E5" is acquired. That is, the OID <2, 2, E5> is obtained from the OID <2, 13, T10> (see FIG. 42(b)).

Next, a case will be described below wherein a ScanAncestorWithTid operator is executed for the second OID <2, 13, T26> of Table 1 in FIG. 42(a) to obtain an OID which is upstream that second OID and has the TID "E16" corresponding to the variable V2. In this case, when the statistical data table of the structure template including the TID "E16" is looked up, since the TID "E16" is a fixed allocation element, the element ID "3" of the TID "E16" can be obtained from the statistical data table without accessing the structured document data storage unit 113 (without tracing respective elements of the structured document data of the document ID "3"). That is, since the OID corresponding to the TID "E16" is fixed, the OID <3, 3, E16> is obtained by converting the TID "T10" and element ID "13" to "E16" and "3" of the OID <2, 13, T10> without converting its document ID "3" (See FIG. 42(b)).

The ScanAncestorWithTid operator is similarly executed for other OIDs on Table 1. As a result, variables V2 corresponding to the respective OIDs obtained for the variable V1 are obtained, and Table 2 is obtained, as shown in FIG. 42(b).

(3) As shown in Table 2 in FIG. 42(b), combinations of values that the variables V1 and V2 can assume (combinations of object IDs) can be obtained. The OIDs included in one combination have an identical document ID.

In this way, since the variables V2 for the "authors" element are embodied by Table 2, a list of data under the "authors" element is output as a retrieval result from the query execution unit 44. The retrieval result is passed from the request processing unit 102 to the client 201 as the retrieval request source. The client 201 displays structured data received from the server 101 on the display unit 205.

Figure 41:
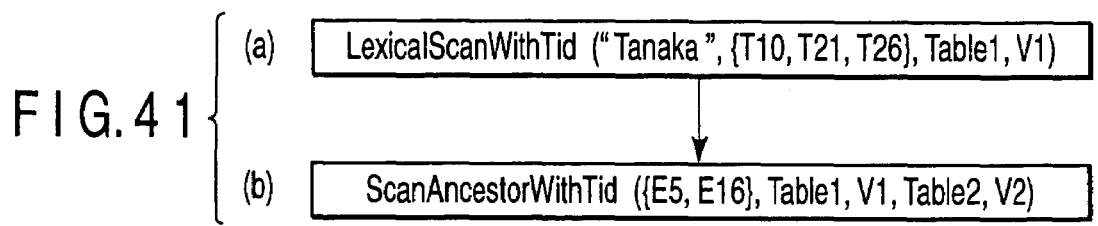
FIG. 41 shows operator sequences used in a retrieval process based on the query graph shown in FIG. 39.
Figure 42:
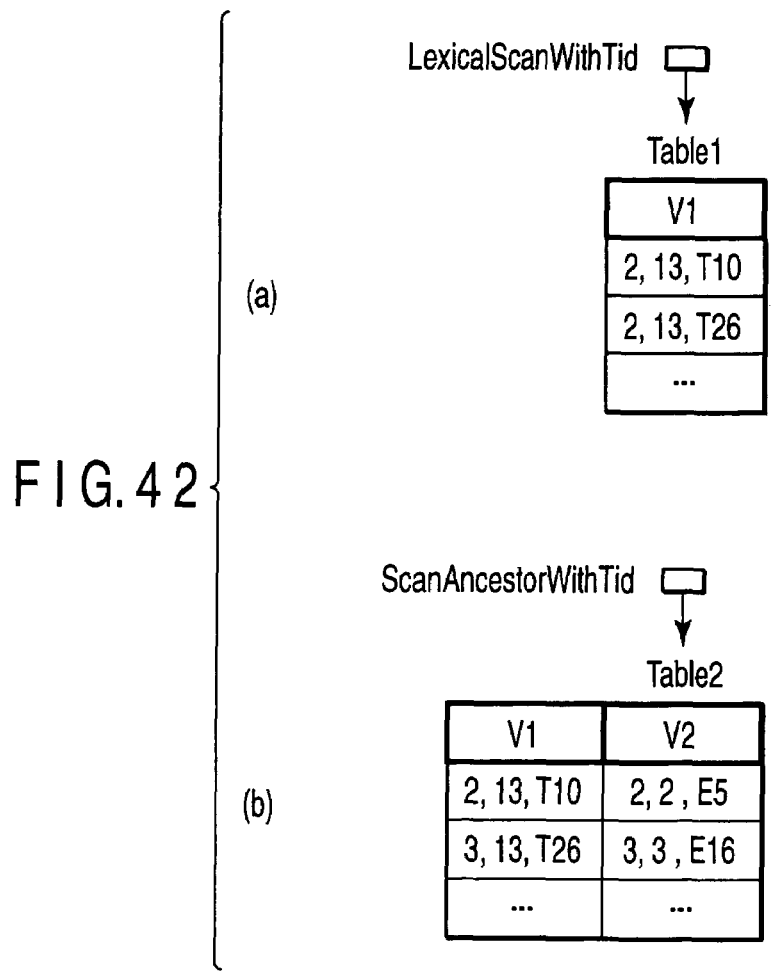
FIG. 42 is a view for explaining the processing operations using the operator sequences shown in FIG. 39.

Based on the query graph shown in FIG. 39, a LexicalScanWithTid operator is executed to obtain the OIDs which include the lexical item "Tanaka" and each of which has one of the TIDs "T10", "T21", and "26", as shown in FIG. 41. As a result, the OIDs <2, 13, T10>, <3, 13, T26>, . . . can be obtained for the variable V1. Note that the template ID "T10" is a structure element included in the structure template ST1, and "T26" is that included in the structure template ST2.

By executing the ScanAncestorWithTid operator, the OIDs for the variable V2 are obtained. These OIDs can be obtained from the values of the OIDs of the variable V1.

Conventionally, in order to acquire an upstream element having the TID "E5" or "E16" from the OID <3, 13, T26> obtained for the variable V1, respective elements of a structured document data file in the structured document DB must be traced. For this purpose, disk I/O occurs.

On the other hand, according to this embodiment, in order to acquire an upstream element having the TID of one of {E5, E16} from the OID <3, 13, T26> obtained for the variable V1, respective elements of a structured document data file in the structured document DB need not be traced. Because, as the element with "T26" is the fixed allocation element, it is apparent that its upstream elements include elements having "E16" of the fixed allocation element. The element ID corresponding to "E16" is "3". As a result, the OID <2, 2, E522> corresponding to the variable V2 which is upstream the OID <2, 13, T10> corresponding to the variable V1 is obtained, and the OID <3, 3, E16> corresponding to the variable V2 which is upstream the OID <3, 13, T26> corresponding to the variable V1 is obtained.

As described above, according to this embodiment, the template ID and element ID are assigned to each element data of structured data upon storing structured data. Especially, an element ID common to a structured data group is assigned to element data assigned the template ID of an element with higher frequency of occurrence of a plurality of elements that form a structure template.

Since the template ID and element ID of each element data represent the document structure of structure data that include the element data of interest and the storage location of that element data, the document structure of respective structure data need not be traced upon retrieval, thus allowing a high-speed retrieval process.

The method of the present invention described in the embodiment of the present invention can be stored as a program that can be executed by a computer in a recording medium such as a magnetic disk (flexible disk, hard disk, or the like), an optical disk (CD-ROM, DVD, or the like), a semiconductor memory, or the like, and can be distributed.

What is claimed is:

1. A method for storing structured data items, each including an individual hierarchical structure of a plurality of elements, comprising:

(a) preparing a first memory having a plurality of document storage areas each including a plurality of element storage areas to which element IDs are assigned respectively as physical addresses of the element storage areas in each document storage area;

(b) storing, in a second memory, a first structure template including a plurality of fixed allocation elements, each fixed allocation element being associated with an element storage area and an element ID of the element storage area, which was previously assigned to each fixed allocation element as a fixed element ID of the fixed allocation element;

(c) inputting a structured data item including an individual hierarchical structure;

(d) extracting, from the structured data item, the individual hierarchical structure thereof, the individual hierarchical structure extracted including the fixed allocation elements;

(e) updating the first structure template by adding an element which is present in the individual hierarchical structure extracted but is not present in the first structure template;

(f) storing the structured data item in one of the document storage areas in the first memory, each fixed allocation element of the structured data item being stored in a corresponding element storage area whose element ID is the same as the fixed element ID of the fixed allocation element, each element other than the fixed allocation elements in the structure data item being assigned an element ID which is not among one of the fixed element IDs, and being stored in the corresponding element storage area having the element ID assigned to the element;

(g) repeating (c) to (f), to store a given number of structured data items in the first memory;

(h) calculating an occurrence frequency of each element of the first structure template, in the structured data items stored in the first memory; and (i) extracting, from the first structure template, a second structure template including the fixed allocation elements and a new fixed allocation element which is an element whose occurrence frequency is more than or equal to a predetermined threshold value, to assign, to the new fixed allocation element, an element storage area and an element ID of the element storage area as a fixed element ID of the new fixed allocation element, wherein the element ID is the physical address of the element storage area.

2. The method according to claim 1, wherein each fixed allocation element in the first structure template is a common element in the structured data items stored in the first memory.

3. The method according to claim 1, wherein storing the structured data item includes:

assigning an identifier to each fixed allocation element included in the structured data item extracted, the identifier including a document ID used to identify the structure data item, a template ID used to identify a location of the fixed allocation element in the first structure template, and the fixed element ID of the fixed allocation element.

4. A structured data storage apparatus including a computer processor, the apparatus further comprising:

a first memory having a plurality of document storage areas each including a plurality of element storage areas to which element IDs are assigned respectively as physical addresses of the element storage areas in each document storage area;

a second memory to store a first structure template including a plurality of fixed allocation elements, wherein each fixed allocation element was previously assigned a fixed element ID that is an address of an element storage area;

an input unit, controlled by the processor, configured to input a plurality of structured data items each including an individual hierarchical structure;

a first extracting unit, controlled by the processor, configured to extract, from each of the structured data items, the individual hierarchical structure thereof, each individual hierarchical structure extracted including the fixed allocation elements;

an updating unit, controlled by the processor, configured to update the first structure template by adding an element which is present in each individual hierarchical structure extracted but is not present in the structure template;

a storing unit, controlled by the processor, configured to store each structured data item of the structured data items in one of the document storage areas in the first memory, each fixed allocation element of the structured data item being stored in a corresponding storage area whose element ID is the same as the fixed element ID of the fixed allocation element, each element other than the fixed allocation elements in the structured data item being assigned an element ID which is not among the fixed element IDs and being stored in a corresponding element storage area having the element ID assigned to the element;

a calculating unit, controlled by the processor, configured to calculate an occurrence frequency of each element of the first structure template, in the structured data items stored in the first memory; and a second extracting unit, controlled by the processor, configured to extract, from the first structure template, a second structure template including the fixed allocation elements and a new fixed allocation element which is an element whose occurrence frequency is more than or equal to a predetermined threshold value, to assign, to the new fixed allocation element, an element storage area and an element ID of the element storage area as a fixed element ID of the new fixed allocation element, wherein the element ID is the physical address of the element storage area.

5. The apparatus according to claim 4, wherein each fixed allocation element in the first structure template is a common element in the structured data items stored in the first memory.

6. The apparatus according to claim 4, further including:
an assigning unit configured to assign an identifier to each fixed allocation element included in each structured data item extracted, the identifier including a document ID used to identify the structure data item, a template ID used to identify a location of the fixed allocation element in the first structure template, and the fixed element ID of the fixed allocation element.

7. A retrieval method for retrieving, from a structured document database, an element of one of structured data items each of which includes a common hierarchical structure of a plurality of elements, the structured document database including a first memory, a second memory, and a third memory, the first memory having a plurality of document storage areas each including a plurality of element storage areas to which element IDs are assigned respectively as physical addresses of the element storage areas in each document storage area, to store the structured data items in the document storage areas respectively, the second memory to store a structure template representing the common hierarchical structure, an element storage area being assigned previously to each element of the structure template, said each element of the structure template having an element name, an element ID of the element storage area assigned to the element, and a template ID used to identify a location of the element in the common hierarchical structure,
each structured data item of the structured data items being stored in one of the document storage areas, wherein an object ID is assigned to each element of the structured data item, the object ID including a document ID used to identify the structured data item, the template ID corresponding to a location of the element in the structure template, and the element ID of the element in the structure template,
each element of the structured data item being stored in a corresponding element storage area whose element ID is included in the object ID of the element,
the third memory storing a lexical table listing a plurality of lexical terms included in the structured data items and linking each lexical term of the lexical table to object IDs of elements each including the lexical term, the method comprising:
inputting retrieval conditions including a first element name of a first element in the structure template and a second element name of a second element which includes the first element in the structure template, and one of the lexical terms which is included in the first element;
acquiring, from the structure template, a first template ID of one of the elements whose element name is the same as the first element name, and a second template ID of another of the elements whose element name is the same as the second element name;
acquiring, from the lexical table, a first object ID which is linked to the one of the lexical terms in the retrieval conditions and includes the first template ID; and
replacing the first template ID in the first object ID by the second template ID, and replacing a first element ID in the first object ID by a second element ID of an element which has the second template ID in the structure template, to obtain a second object ID including a document ID included in the first object ID, the second template ID, and the second element ID, wherein the element ID is the physical address of the element storage area.

8. The retrieval method according to claim 7, wherein an element corresponding to the second object ID is stored in one of the element storage areas which the second element ID is assigned to and is included in one of the document storage areas corresponding to the document ID in the second object ID.

* * * * *